(12) United States Patent
Calciu et al.

(10) Patent No.: US 11,099,871 B2
(45) Date of Patent: Aug. 24, 2021

(54) USING CACHE COHERENT FPGAS TO ACCELERATE LIVE MIGRATION OF VIRTUAL MACHINES

(71) Applicant: VMware, Inc., Palo Alto, CA (US)

(72) Inventors: Irina Calciu, Palo Alto, CA (US); Jayneel Gandhi, Sunnyvale, CA (US); Aasheesh Kolli, Palo Alto, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 301 days.

(21) Appl. No.: 16/048,182

(22) Filed: Jul. 27, 2018

(65) Prior Publication Data
US 2020/0034175 A1 Jan. 30, 2020

(51) Int. Cl.
*G06F 9/455* (2018.01)
*G06F 12/0891* (2016.01)

(52) U.S. Cl.
CPC ...... *G06F 9/45558* (2013.01); *G06F 12/0891* (2013.01); *G06F 2009/4557* (2013.01); *G06F 2009/45575* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 5,764,934 A | 6/1998 | Fisch et al. | |
| 6,275,907 B1 | 8/2001 | Baumgartner et al. | |
| 7,415,575 B1 | 8/2008 | Tong et al. | |
| 8,413,145 B2 * | 4/2013 | Chou | G06F 11/2097 718/1 |
| 9,058,272 B1 | 6/2015 | O'Bleness et al. | |
| 9,355,035 B2 * | 5/2016 | Goodman | G06F 12/0828 |
| 2005/0240745 A1 | 10/2005 | Iyer et al. | |
| 2005/0273571 A1 | 12/2005 | Lyon et al. | |
| 2006/0059317 A1 | 3/2006 | Kakeda | |
| 2007/0180197 A1 | 8/2007 | Wright et al. | |
| 2008/0086600 A1 | 4/2008 | Qiao | |
| 2008/0127182 A1 | 5/2008 | Newport et al. | |
| 2008/0209127 A1 | 8/2008 | Brokenshire et al. | |

(Continued)

FOREIGN PATENT DOCUMENTS

KR 20180092273 A * 8/2018 ........... G06F 12/084

OTHER PUBLICATIONS

Yang et al., "LEAP Shared Memroies: Automating the Construction of FPGA Coherent Memories", 2014, IEEE, pp. 117-124. (Year : 2014).*

*Primary Examiner* — Kenneth Tang
(74) *Attorney, Agent, or Firm* — Patterson + Sheridan, LLP

(57) ABSTRACT

A virtual machine running on a source host is live migrated to a destination host. The source host includes a first processing node with a first processing hardware and a first memory, and a second processing node with a second processing hardware and a second memory. While the virtual machine is running on the first processing hardware, the second processing hardware tracks cache lines of the first processing hardware that become dirty as a result of write operations performed on one or more memory pages of the virtual machine. The dirty cache lines are copied to the destination host in units of a cache line or groups of cache lines.

18 Claims, 29 Drawing Sheets

(56) References Cited

U.S. PATENT DOCUMENTS

| | | |
|---|---|---|
| 2009/0300289 A1 | 12/2009 | Kurts et al. |
| 2010/0274987 A1 | 10/2010 | Subrahmanyam et al. |
| 2010/0313201 A1 | 12/2010 | Warton et al. |
| 2011/0093646 A1 | 4/2011 | Koka et al. |
| 2011/0137861 A1 | 6/2011 | Burnett et al. |
| 2011/0252200 A1 | 10/2011 | Hendry et al. |
| 2014/0108854 A1* | 4/2014 | Antony ................. G06F 11/203 714/4.2 |
| 2014/0201460 A1* | 7/2014 | Blaner ................. G06F 12/0815 711/141 |
| 2015/0052309 A1 | 2/2015 | Philip et al. |
| 2015/0095576 A1* | 4/2015 | Subrahmanyam .. G06F 12/0891 711/119 |
| 2015/0095585 A1 | 4/2015 | Subrahmanyam et al. |
| 2016/0253197 A1 | 9/2016 | Bonzini et al. |
| 2016/0321181 A1 | 11/2016 | Kaxiras et al. |
| 2017/0031825 A1 | 2/2017 | Chen et al. |
| 2017/0192886 A1 | 7/2017 | Boehm et al. |
| 2018/0189087 A1* | 7/2018 | Palermo ............... G06F 9/45558 |
| 2018/0239707 A1 | 8/2018 | Tsirkin |
| 2018/0373553 A1* | 12/2018 | Connor ............... G06F 9/45558 |
| 2018/0373561 A1 | 12/2018 | Nassi et al. |
| 2019/0179750 A1 | 6/2019 | Moyer et al. |
| 2019/0207714 A1* | 7/2019 | Loewenstein ....... G06F 12/0813 |
| 2019/0266101 A1 | 8/2019 | Robinson et al. |
| 2019/0278713 A1 | 9/2019 | Gandhi et al. |
| 2020/0034176 A1 | 1/2020 | Calciu et al. |
| 2020/0034200 A1 | 1/2020 | Calciu et al. |
| 2020/0034294 A1 | 1/2020 | Calciu et al. |
| 2020/0125384 A1* | 4/2020 | Serebrin ............... G06F 9/4856 |
| 2020/0285580 A1 | 9/2020 | Subramanian et al. |

\* cited by examiner

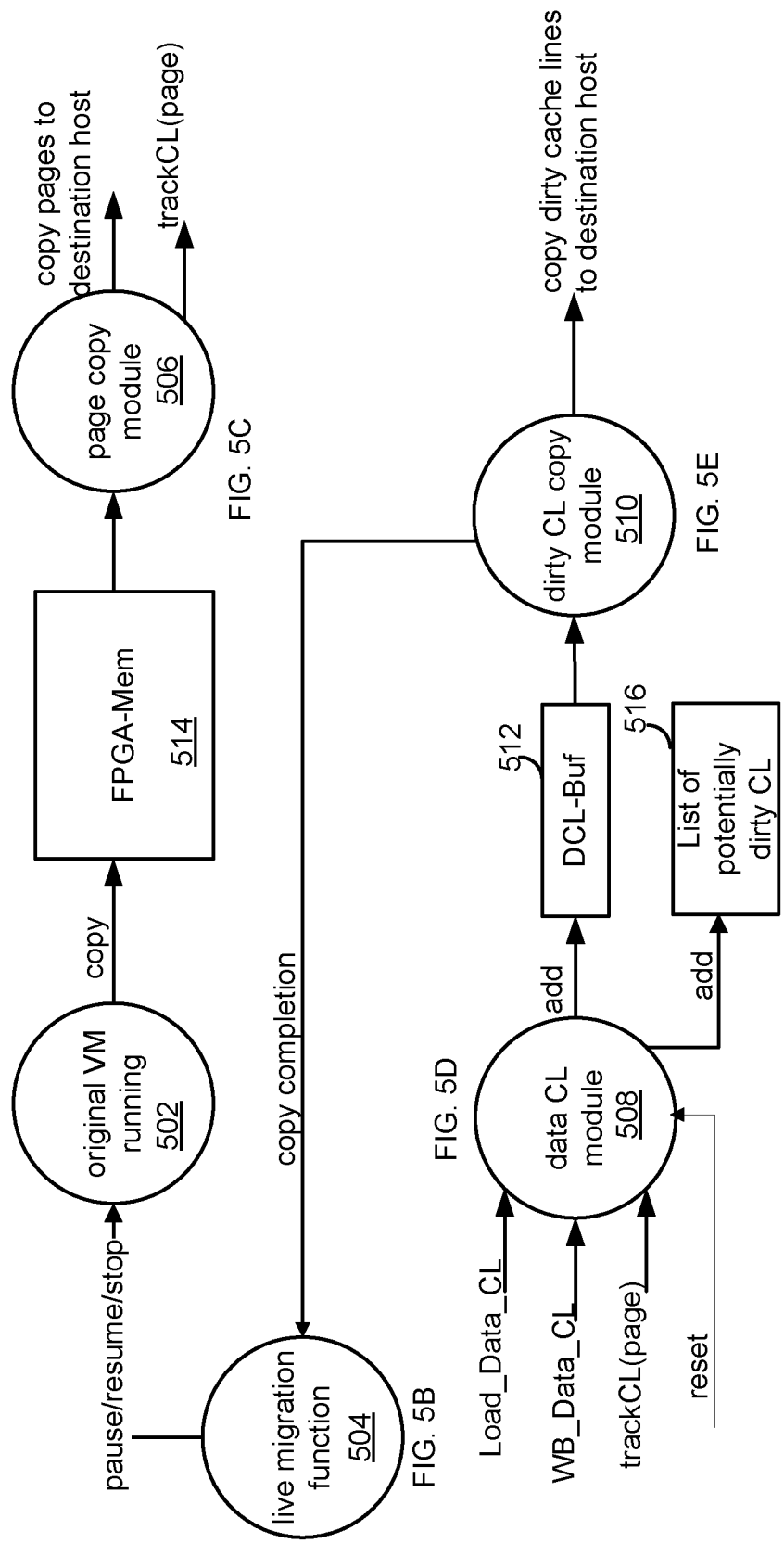

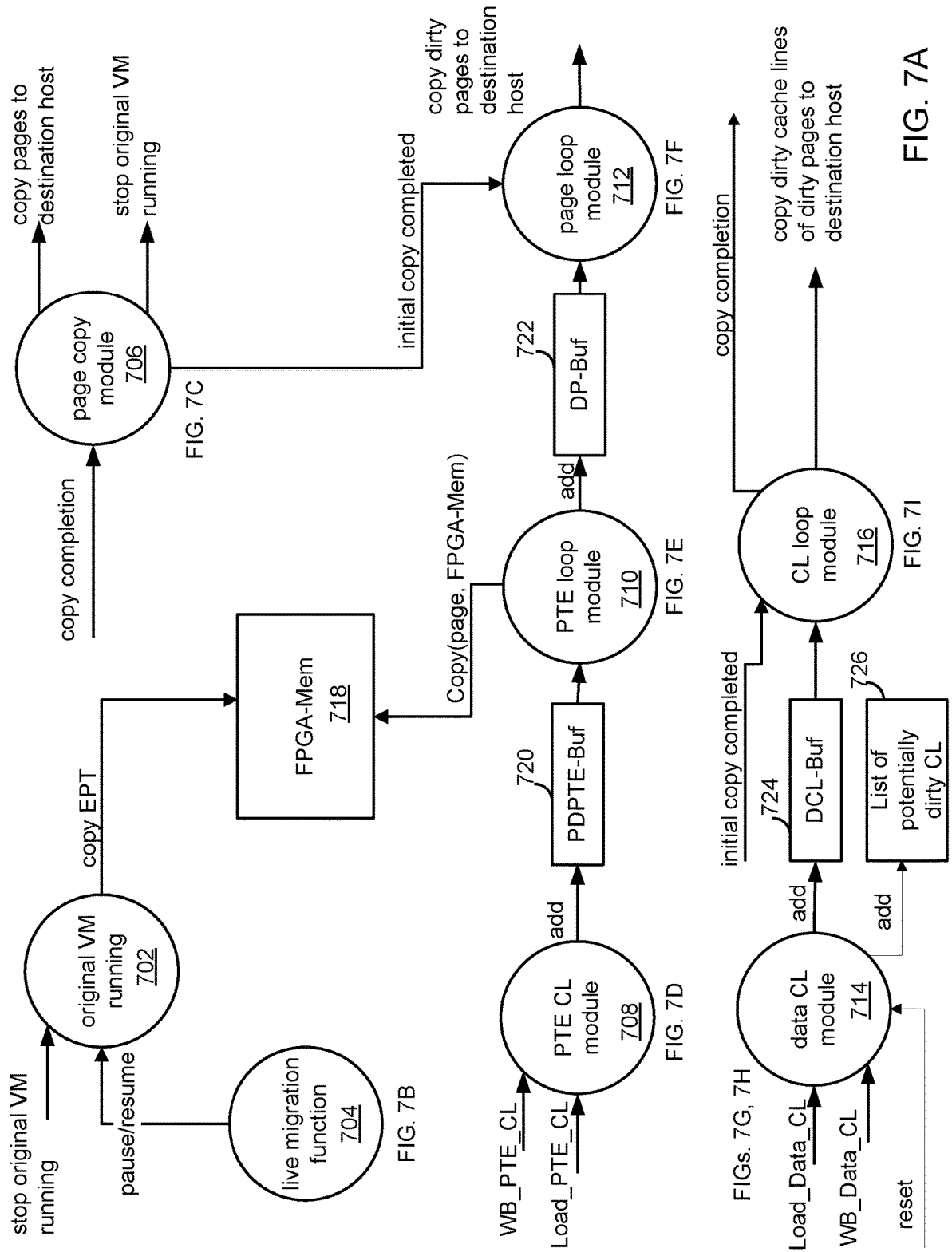

USING CACHE COHERENT FPGAS TO ACCELERATE LIVE MIGRATION OF VIRTUAL MACHINES

CROSS-REFERENCE TO RELATED APPLICATIONS

This application is related to:

U.S. application Ser. No. 16/048,180, filed on Jul. 27, 2018, which application is incorporated by reference in its entirety into the present application, U.S. application Ser. No. 16/048,178, filed on Jul. 27, 2018, U.S. application Ser. No. 16/048,183, filed on Jul. 27, 2018, and U.S. application Ser. No. 16/048,186, filed on Jul. 27, 2018.

BACKGROUND

In an application, such as live migration of virtual machines from a source host to a destination host, all of the memory pages of the virtual machine are initially copied from a source host running the virtual machine to a destination host. After the initial copy and while the virtual machine is still running, pages that were copied can and do become dirty. This requires that each newly dirtied page must be again copied to the destination host, resulting in many transfers in units of pages to the destination host. After the number of dirty pages becomes small enough, the virtual machine on the source host is stunned (i.e., paused or stopped), the remaining dirty pages are copied to the destination host and the virtual machine is then resumed on the destination host. However, because the smallest item that can be tracked is a page, the memory pages that become dirty can only be tracked by write protecting them and catching page faults caused when the write-protected page is written, which is time consuming. In addition, even though only a small portion of the memory page may have been modified, the entire page is copied over to the destination. The catching and servicing of page faults and the copying of entire pages are an inefficient use of resources and slow down the live migration operation.

SUMMARY

One or more embodiments employ cache coherent FPGAs to enhance live migration of virtual machines. A virtual machine running on a source host is live migrated to a destination host. The source host includes a first processing node with a first processing hardware and a first memory, and a second processing node with a second processing hardware, e.g., the cache coherent FPGA, and a second memory. While the virtual machine is running on the first processing hardware, the second processing hardware tracks cache lines of the first processing hardware that become dirty as a result of write operations performed on one or more memory pages of the virtual machine. The dirty cache lines are copied to the destination host in units of cache lines. In some embodiments, dirty cache lines are aggregated into dirty pages and copied to the destination host in units of a page.

Further embodiments include a device for carrying out one or more aspects of the above method, and a system configured to carry out one or more aspects of the above method.

BRIEF DESCRIPTION OF THE DRAWINGS

FIG. 5A depicts graphically the various components involved in the live migration procedure in another embodiment.

FIG. 7A depicts graphically the various components involved in the live migration procedure in yet another embodiment.

DETAILED DESCRIPTION

Figure 1:
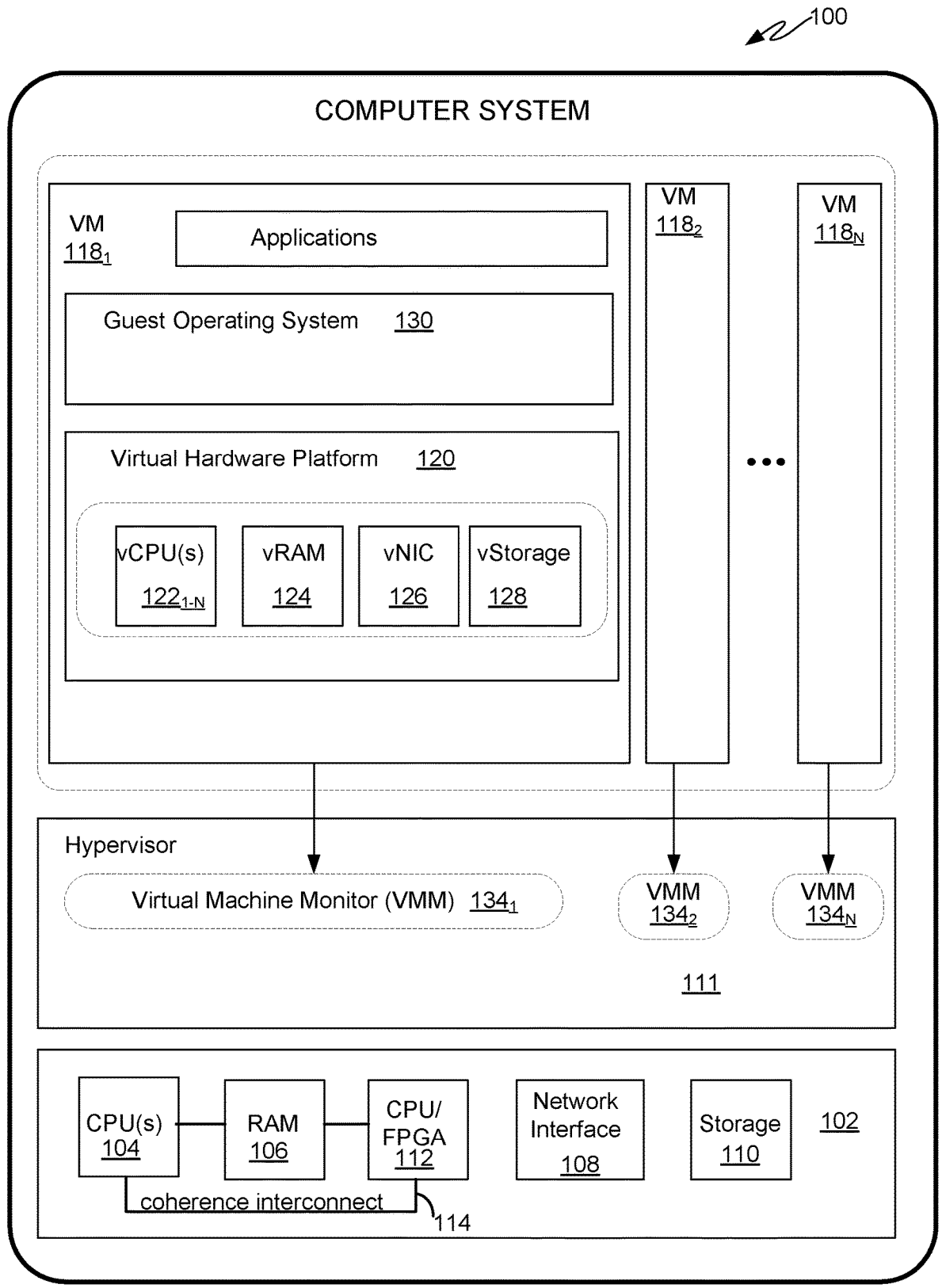
FIG. 1 depicts a block diagram of a computer system that is representative of a virtualized computer architecture in which embodiments may be implemented.

FIG. 1 depicts a block diagram of a computer system 100 that is representative of a virtualized computer architecture in which embodiments may be implemented. As is illustrated, computer system 100 hosts multiple virtual machines (VMs) 118$_1$-118$_N$ that run on and share a common hardware platform 102. Hardware platform 102 includes conventional computer hardware components, such as one or more items of processing hardware such as central processing units (CPUs) 104, a point-to-point coherence interconnect between processors which supports a cache coherence protocol such as the UltraPath Interconnect (UPI), random access memory (RAM) 106, one or more network interfaces 108, and persistent storage 110. In the embodiment illustrated herein, another item of processing hardware, a field programmable gate array (FPGA) 112, is installed in one of the CPU sockets and communicates with one or more CPUs 104 via coherence interconnect 114. Though the following discussion has the FPGA occupy a CPU socket, the embodiments are not so limited; any arrangement of the FPGA that includes a connection to the coherence interconnect among processors present in computer system 100 is sufficient.

A virtualization software layer, referred to herein after as hypervisor 111, is installed on top of hardware platform 102. Hypervisor 111 makes possible the concurrent instantiation and execution of one or more VMs 118$_1$-118$_N$. The interaction of a VM 118 with hypervisor 111 is facilitated by the virtual machine monitors (VMMs) 134. Each VMM 134$_1$-134$_N$ is assigned to and monitors a corresponding VM 118$_1$-118$_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM 118$_1$-118$_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) 122$_1$-122$_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, and the Linux® operating system, and the like.

It should be recognized that the various terms, layers, and categorizations used to describe the components in FIG. 1 may be referred to differently without departing from their functionality or the spirit or scope of the disclosure. For example, VMMs 134$_1$-134$_N$ may be considered separate virtualization components between VMs 118$_1$-118$_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 2:
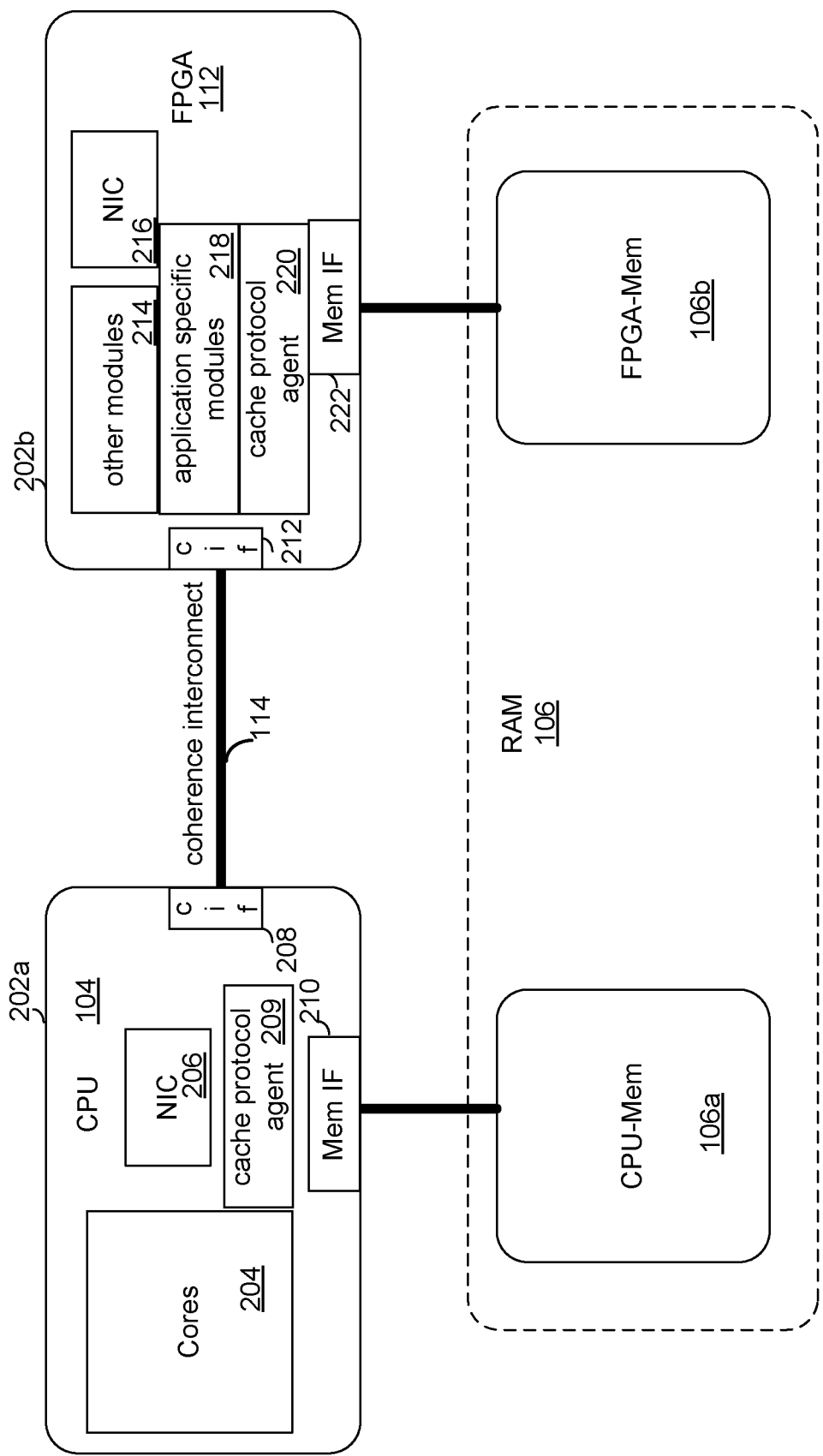
FIG. 2 depicts a block diagram of a pair of CPU sockets for CPUs in FIG. 1, in an embodiment.

FIG. 2 depicts a block diagram of a pair of CPU sockets, with a first socket 202a for CPU 104 and a second socket 202b for FPGA 112. CPU 104 includes one or more processing cores 204, an interface 210 to CPU memory (CPU-Mem) 106a accessible by CPU 104, a network interface controller (NIC) 216, a communications interface (cif) port 208 connected to coherence interconnect 114 and a cache protocol agent 209. FPGA 112 is configured with a network interface 216, one or more application-specific modules 218, a cif port 212 and a cache protocol agent 220. Application specific modules 218 are configured by a bitstream representing custom programming of FPGA 112. Other modules and functions 214 whose operations are unrelated to application-specific modules 218 may be present in FPGA 112, these modules and functions being configured by a bitstream different from the custom programming bitstream. FPGA 112 has an interface 222 to its own memory, FPGA memory 106b (FPGA-Mem), which is a restricted portion of RAM 106. In one embodiment, each CPU socket, 202a, 202b, represents a separate Non-Uniform Memory Access (NUMA) domain. The application or the VM is running on the CPU, located on the first socket 202a, while the FPGA is on the second socket 202b.

In one embodiment, the CPU 104 has a cache (not shown in FIG. 2), which is used to reduce the average cost to access data from the memory. Data transferred between memory and cache in blocks of fixed size, called cache lines or cache blocks. When a cache line is copied from memory into the cache, a cache entry is created, which includes the copied data as well as the requested memory location (called a tag). When the CPU needs to read or write a location in the memory, it first checks for a corresponding entry in the cache. The cache checks for the contents of the requested memory location in any cache lines that might contain that address. If the processor finds that the memory location is in the cache, a cache hit has occurred; the CPU immediately reads or writes the data in the cache line. However, if the CPU does not find the memory location in the cache, a cache miss has occurred. For a cache miss, the cache allocates a new entry and copies data from main memory, then the request is fulfilled from the contents of the cache.

Cif ports 208, 212, mentioned above, support a coherence protocol, which is designed to maintain cache coherence in a system with many processors each having its own cache. With FPGA 112 residing in one socket 202b of the CPU sockets and having its own cif port 212, FPGA 112 can monitor and participate in the coherency protocol that keeps the processor caches coherent.

Cache coherence on coherence interconnect 114 is maintained according to a standard protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into the cache from memory accessible by the cache. Cache lines marked exclusive, shared and forwarded (in the MESIF protocol) all signify that the cache line has valid data, but the cache line is clean (not modified), so the cache line can be discarded without writing the cache line back the data to memory. A cache line marked as modified signifies one that holds a modified or dirty cache line, and must be written back to memory before the cache line is discarded from the cache.

To enforce the cache coherence protocol requires a cache protocol agent for each cache connected to a coherence interconnect. Each cache protocol agent can initiate and respond to transactions on the coherence interconnect by sending and receiving messages on the interconnect. In the present embodiments, CPU 104 has cache protocol agent 209 and FPGA 112 has cache protocol agent 220.

When a CPU accesses a cache line that is not in its cache, at any level of the cache hierarchy, cache protocol agent 209 of CPU 104 requests the cache line. Thus, cache protocol agent 209 in the CPU issues a load cache line transaction on coherence interconnect 114. This can be 'Load Shared' for sharing the cache line, or 'Load Exclusive' for cache lines that will be modified. A cache line that is loaded as 'Exclusive' is considered potentially dirty, because it is not certain the cache line will be modified. When the cache line gets evicted from the CPU hardware caches, if it is modified, it must be written back to the memory from which it originated. The operation of writing the cache line back is present on coherence interconnect 114 as a writeback transaction and can be monitored for tracking dirty cache lines. In the case of a writeback transaction, the cache line is actually dirty, rather than potentially dirty.

To confirm whether a cache line is dirty or not, a cache protocol agent, such as agent 220 in FPGA 112, can snoop the cache line in accordance with the coherence interconnect protocol. This causes a writeback transaction to be triggered, if the cache line is dirty.

Migrating a VM, such as VM $118_1$ in FIG. 1 from its current host (source) to a destination host (destination) serves various purposes such as load balancing, fault tolerance, and decommissioning of a host. A successful migration entails performing the migration with minimal interruption and performance degradation of the execution of the original VM and with as little use of resources, such as network bandwidth, as possible, while the VM continues to run. While running, the original VM may modify some of the pages that have already been copied to the destination, so a mechanism is needed to track these pages and re-copy them to the destination. FIGS. 3A-3D depict such a migration procedure in detail.

Figure 3A:
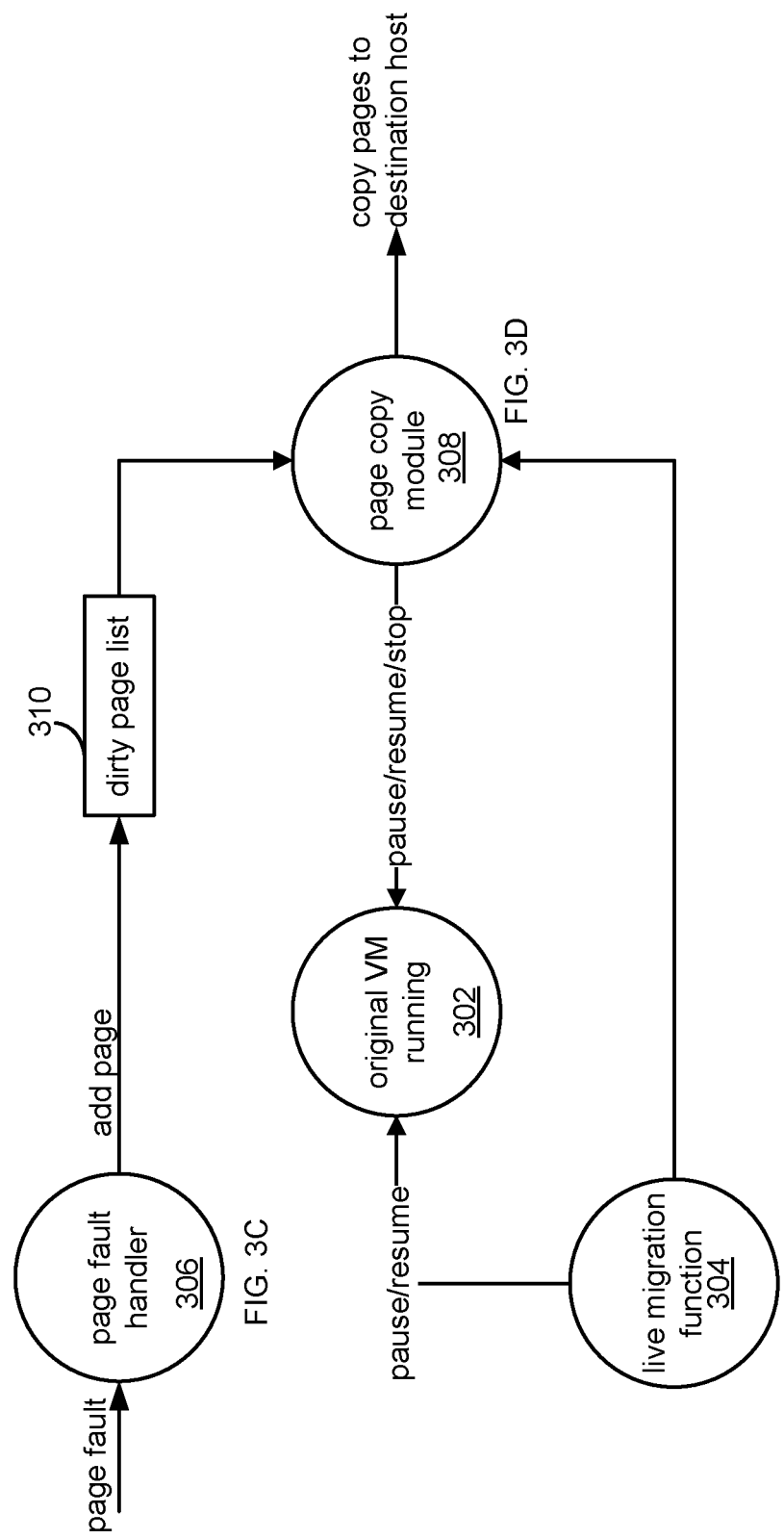
FIG. 3A depicts graphically the various components involved in the live migration procedure, in an embodiment.

FIG. 3A depicts graphical the various components involved in the live migration procedure. The live migration procedure includes the main line portion, which is live migration function 304 described in regard to FIG. 3B, a dirty page list (dpL) 310, an original virtual machine (VM) 302, a page fault handler 306, which is described in reference to FIG. 3C and a page copy module 308, which is described in reference to FIG. 3D.

Figure 3B:
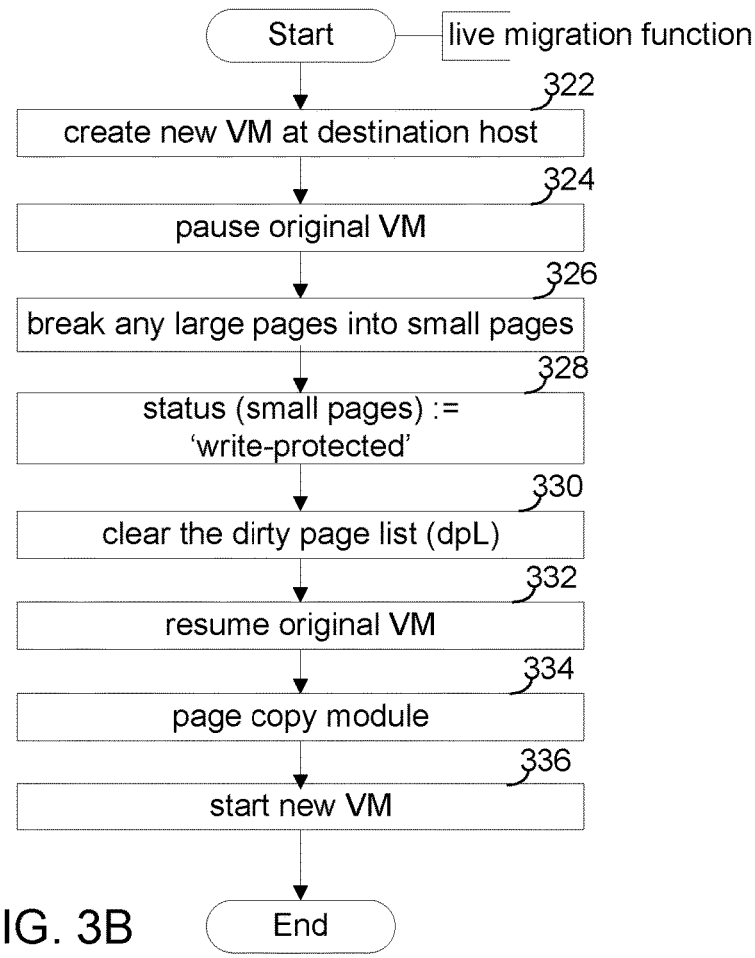
FIG. 3B depicts the live migration function, in an embodiment.

FIG. 3B depicts the live migration function. In step 322, hypervisor 111 creates a new, but empty VM at the destination host. In step 324, hypervisor 111 pauses original VM 302. In step 326, hypervisor 111 breaks up any large pages into small pages and sets the status of the small pages to "write protected" in step 328. Breaking large pages into small pages is effective in reducing the amount of data to be copied to the destination host, because if a small portion of a large page were dirty, the entire large page would still have to be sent to the destination. In step 330, hypervisor 111 clears dpL 310. In step 332, hypervisor 111 then resumes original VM 302 and starts page copy module 308 in step 334 which copies pages to the destination host. In step 336, after all of the pages are copied, hypervisor 111 starts the new VM.

Figure 3C:
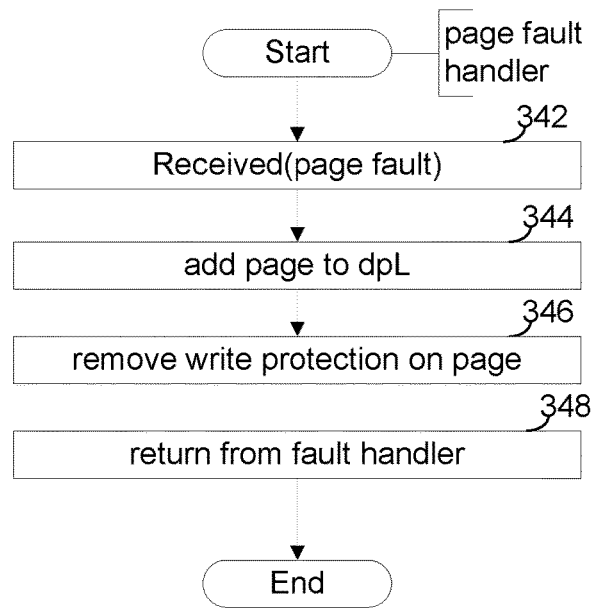
FIG. 3C depicts a flow chart for the page fault handler, in an embodiment.

FIG. 3C depicts a flow chart for the page fault handler. In step 342, handler 306 receives a page fault message due to the page being write protected, the message representing a page fault event. As used herein, in a step having the form of 'Received(msg)', such as step 342, 'Received(msg)' is a predicate, which, if true, is interpreted as signaling that an asynchronous message, msg, has been received. If no message has been received, the function or module is blocked waiting for a message to arrive. However, the function or module an test the predicate to avoid being blocked. In addition, embodiments described herein are not limited by any specific form or method of receiving messages. In step 344, handler 306 adds a page to dpL 310 and in step 346 removes write protection on that page. In step 348, handler 306 returns from the fault.

Figure 3D:
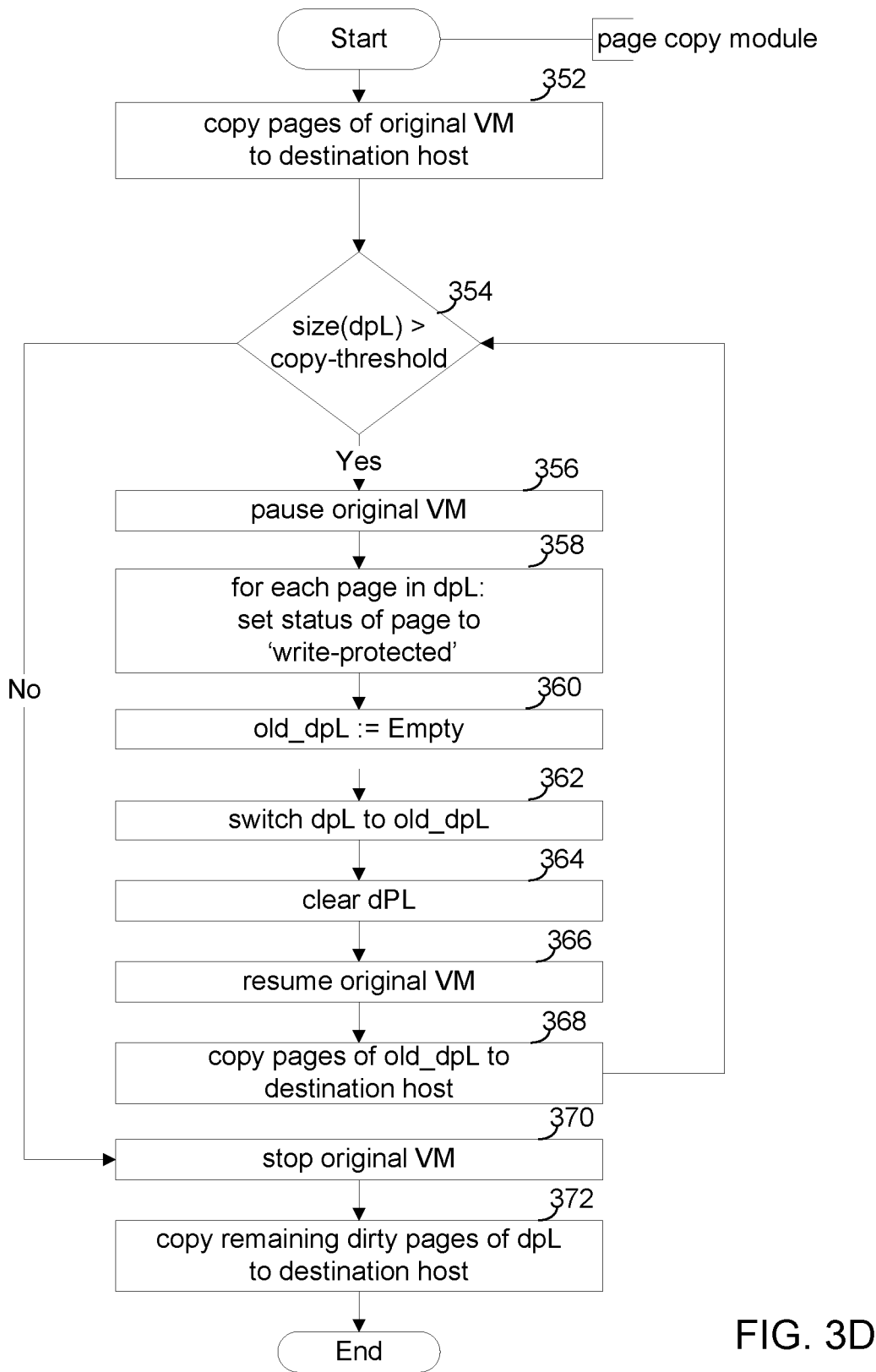
FIG. 3D depicts a flow chart for the page copy module, in an embodiment.

FIG. 3D depicts a flow chart for the page copy module. In step 352, hypervisor 111 runs a function that copies the pages of original VM 302 to the destination host. While the function is running, hypervisor 111 keeps track of the dirty pages in dpL 310. Upon completion of step 352, hypervisor 111 then checks the size of dpL 310 in step 354 to determine if it is greater than a copy-threshold. If the size of dpL 310 exceeds the copy-threshold as determined in step 354, then hypervisor 111 pauses original VM 302 in step 356, and for each page in dpL 310, sets the status of the page to "write-protected" in step 358 to catch subsequent writes to the page. In step 360, hypervisor 111 switches dpL 310 to an old dirty page list (old_dpL) in step 362 and clears dpL 310 in step 364. As original VM 302 is paused, this assures that dpL 310 is correctly captured into the old_dpL. In step 366, hypervisor 111 resumes original VM 302 and in step 368, copies the pages of the old_dpL to the destination host. Steps 354-368 are repeated until the size of dpL 310 is less than or equal than the copy threshold. Thus, pages made dirty by the running VM are copied to the destination host.

If, in step 354, hypervisor 111 determines that the size of dpL 310 is less than the copy threshold then, hypervisor 111 stops original VM 302 in step 370 (sometimes called 'stunning' the VM) and in step 372 copies any remaining pages in dpL 310 to the destination host.

As mentioned in regard to FIG. 3B, when page copy module 308 completes, hypervisor 111 starts (or causes to start) the new virtual machine in step 336.

The above migration procedure suffers from a number of inefficiencies. First, handling write page faults in the hypervisor is a time-consuming procedure. Second, if a page becomes dirty, regardless of the amount of data changed in a page, the entire page must be recopied to the destination host. Third, each operation of copying of the dirty page list to the destination host requires that the virtual machine be paused and resumed, thus slowing down the original virtual machine during the migration procedure. It is desirable that this migration procedure be made more efficient.

Figure 4A:
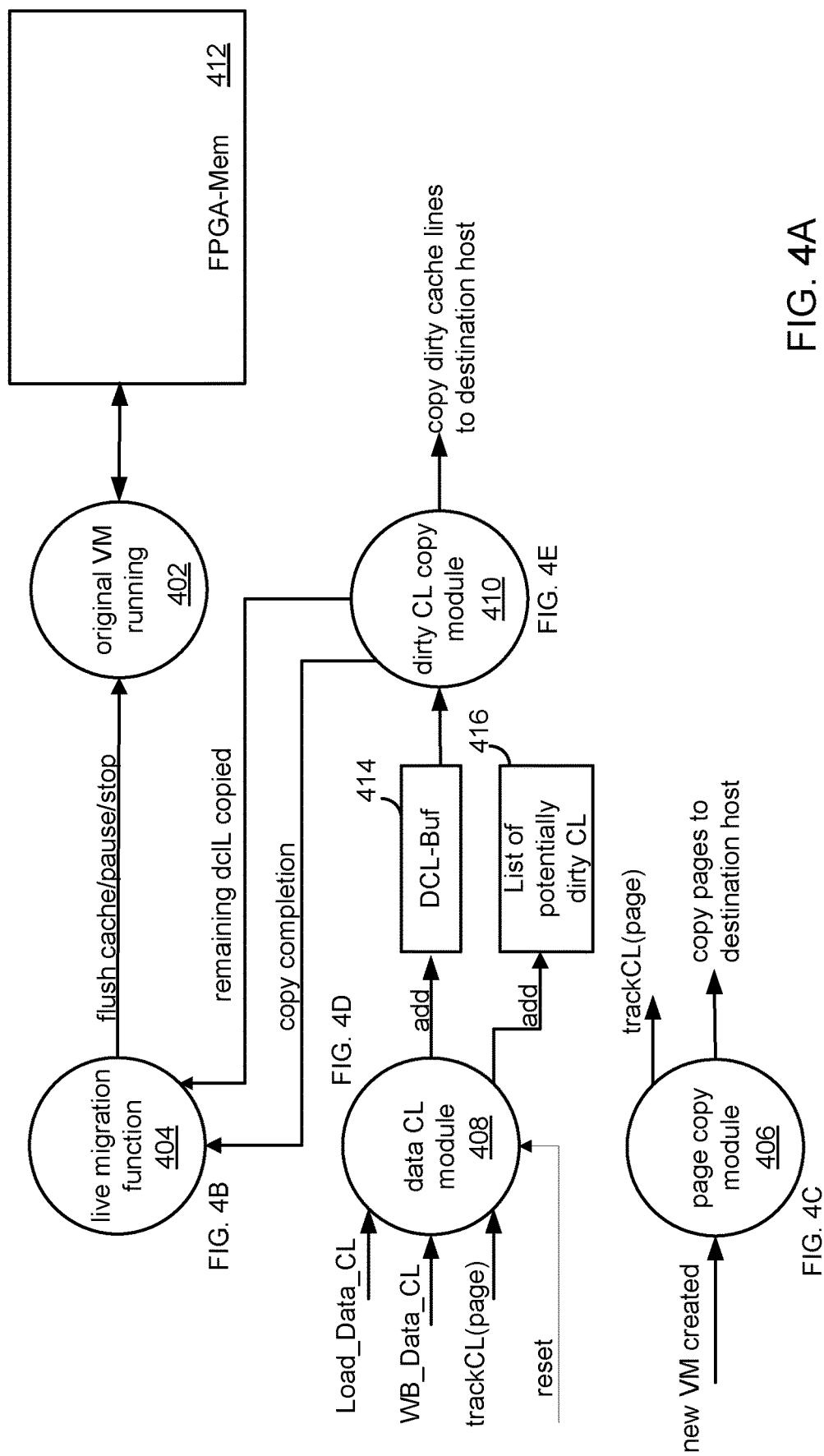
FIG. 4A depicts graphically the various components involved the live migration procedure in one embodiment.

FIG. 4A depicts graphically the various components involved in the live migration procedure in one embodiment. The procedure includes the main line portion, which is live migration function 404, described in regard to FIG. 4B, a page copy module 406 described in regard to FIG. 4C, a data CL module 408 described in regard to FIG. 4D, a dirty cache line buffer (DCL-Buf) 414, a list 416 of potentially dirty cache lines (CL), a dirty CL copy module 410 described in regard to FIG. 4E and an FPGA memory (FPGA-Mem) 412 accessible by an FPGA residing in one of the CPU hardware sockets 104, 112. In the discussion of FIGS. 4B-4E, the memory pages of original virtual machine 402 reside in FPGA-Mem 412. In addition, DCL-Buf 414 may be implemented in a number of ways. For example, the buffer can be implemented as a circular buffer of addresses to represent dirty cache lines, a bit map mapping the dirty cache lines of a page to represent the dirty cache lines in the page, an unbounded list or log of addresses representing dirty cache lines, a bounded list, a hash table or a tree. In the case of the unbounded list of addresses, the list can be sorted or unsorted. In the case of a hash table, each hash bucket can represent a page and can contain a sorted or unsorted list of cache lines belonging to the page and hash buckets can be merged or coalesced if entire pages are dirty. In the case of a tree, the neighbor nodes in the tree can represent spatial locality of the pages and neighbor nodes in the tree can be merged or coalesced if entire pages are dirty.

Figure 4B:
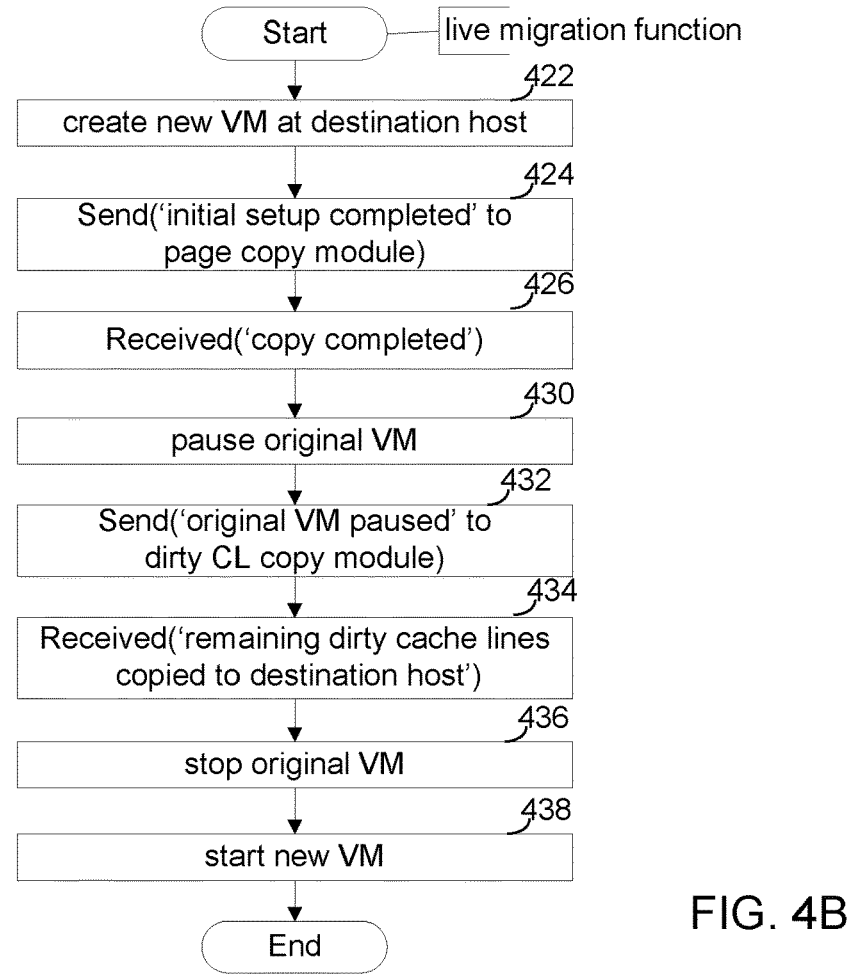
FIG. 4B depicts a flow chart for the live migration function, in an embodiment.

FIG. 4B depicts a flow chart for the main line portion, which is the live migration function. In step 422, function 404 creates a new, but empty VM at the destination host. In step 424, function 404 sends an 'initial setup completed' message to page copy module 406. As used herein, a step containing a message in the form of 'Send(msg to dest)', such as that in step 424, is an asynchronous non-blocking transmission of a message, msg, to a destination, dest. However, embodiments are not limited by any specific form or method of sending a message. In step 426, function 404 receives a 'copy completed' message from dirty CL copy module 410, indicating copying has caused DCL-Buf 414 to be below a threshold. In step 430, function 404 pauses original VM 402 and in step 432 sends an 'original VM paused' message to dirty CL copy module 410 indicating that original VM 402 is paused. In step 434, function 404 receives a 'remaining dirty cache lines copied to the destination host' message from dirty CL copy module 410. In response, in step 436, function 404 stops original VM 402 and in step 438, starts the new VM in the destination host. In one embodiment, hypervisor 111 carries out steps 422-438 of live migration 404.

Figure 4C:
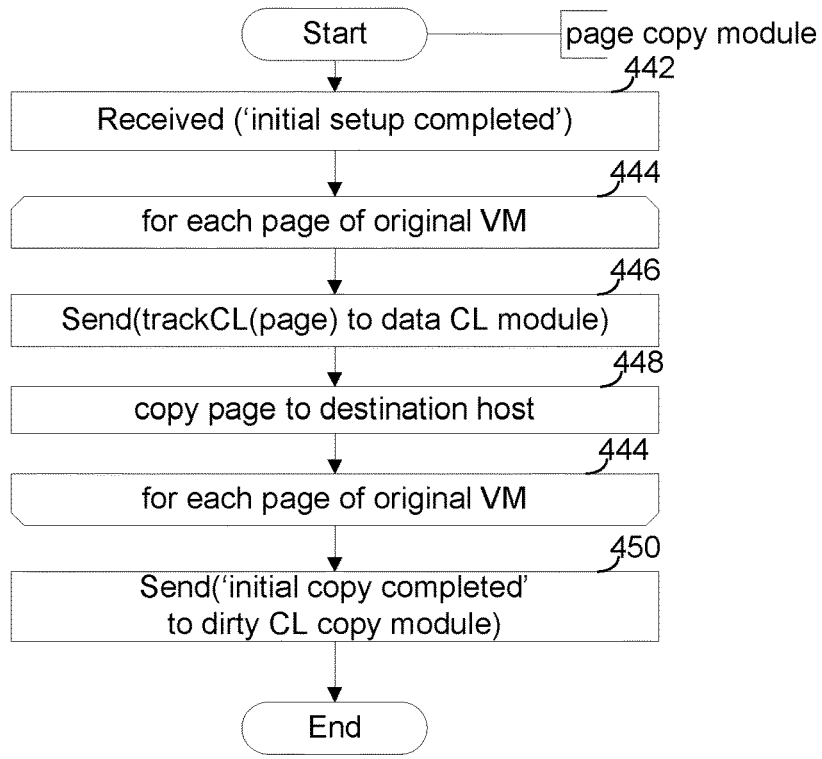
FIG. 4C depicts a flow chart for the page copy module, in an embodiment.

FIG. 4C depicts a flow chart for the page copy module. This module 406, in step 442, receives an 'initial setup completed' message from live migration function 404. In response, in step 444, module 406 starts an iterator over steps 446 and 448, which are carried out for each page. Step 446 sends a track dirty cache lines for the page message to data CL module 408 and step 448 copies the page to the destination host. After all of the pages of the original VM are copied to the destination host, then in step 450, the module sends an 'initial copy completed' message to dirty CL copy module 410. In one embodiment, module 406 is included in application-specific modules 218 in FPGA 112, which carries out steps 442-450 of module 406, thereby relieving hypervisor 111 of the burden in performing the operation of copying the pages of original VM 402 to the destination host.

Figure 4D:
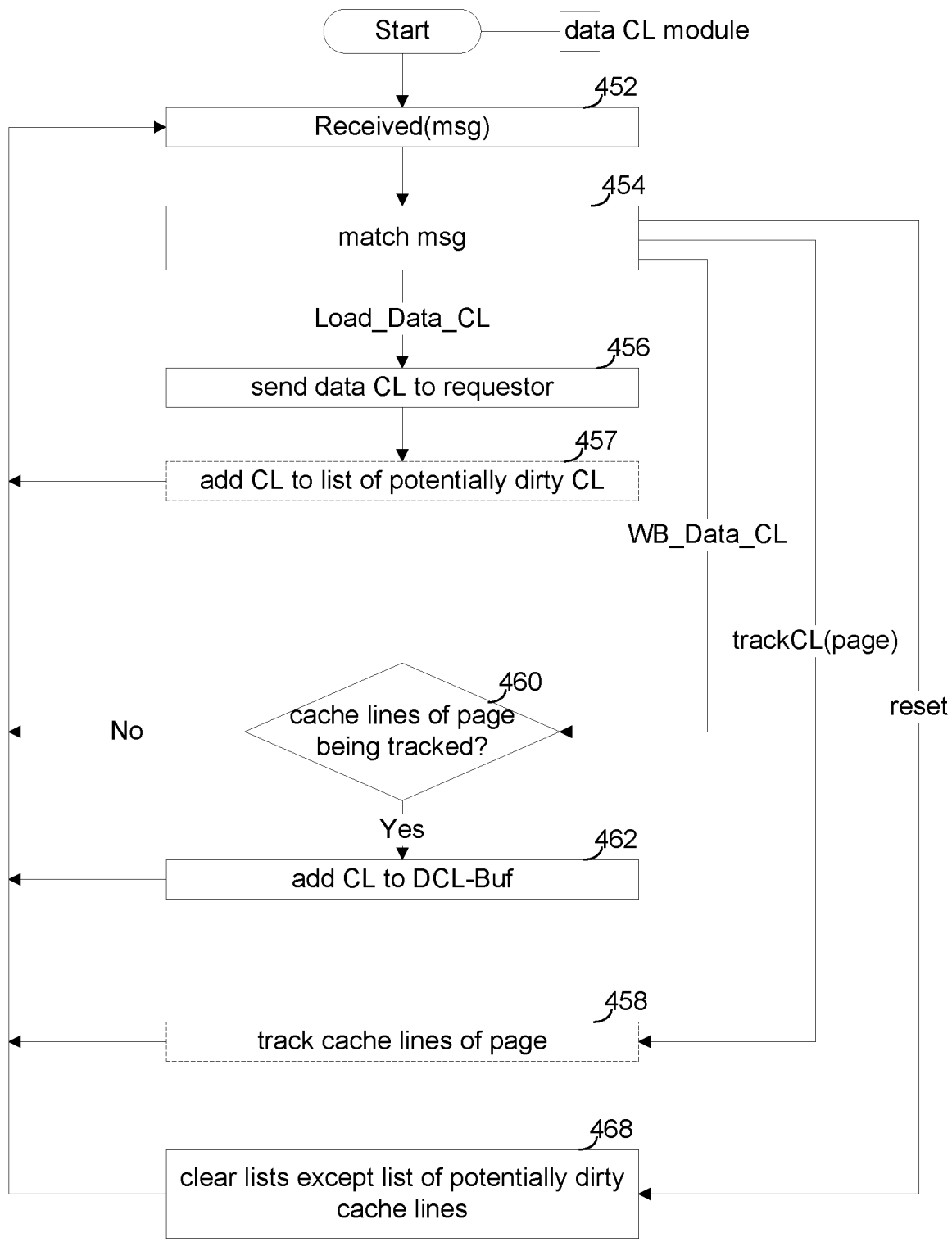
FIG. 4D depicts a flow chart for the data CL module, in an embodiment.

FIG. 4D depicts a flow chart for the data CL module. Data CL module 408 monitors cache coherence events of CPU 104, which are available on the coherence interconnect between cif ports 208 and 212 in FIG. 2. In step 452, module 408 receives a message. In step 454 matches the message to one of four messages, 'Load_Data_CL', 'WB_Data_CL', 'trackCL(page)', and 'reset', the first two corresponding to coherence events (i.e., transactions) on coherence interconnect 114, and the 'trackCL(page)' being a message from page copy module 406. In step 456, module 408 handles the 'Load_Data_CL' message, corresponding to a load cache event (i.e., transaction), by sending the cache line data to the requester. In optional step 457, module 408 adds the cache line (CL) to list 416 of potentially dirty cache lines. In optional step 458, module 408 handles the 'trackCL(page)' message by tracking the cache line of the page received in the message. In step 460, module 408 handles the 'WB_Data_CL' message, corresponding to a write back event (i.e., transaction), or the processor executing a store instruction, which bypasses the caches in the cache hierarchy. Such a store instruction is recognized by cache protocol agent 220 of FPGA 112. Module 408 handles the 'WB_Data_CL' message by testing whether the cache lines of the page are being tracked, and if so, then in step 462, adding the cache line to DCL-Buf 414. Thus, if tracking the cache lines of the page has been requested, then module 408 tracks the dirty cache lines of the page as a result of receiving the 'WB_Data_CL' message. In step 468, module 408 handles the 'reset' message by clearing its internal lists, e.g., the DCL-Buf 414, but not list 416 of potentially dirty cache lines. In one embodiment, module 408 is included in application-specific modules 218 in FPGA 112, which performs steps 452-468. Though data CL module is used here to monitor cache coherence events of CPU 104 in the context of a hypervisor and the transfer of pages of a virtual machine, it is not so limited. Data CL module 408 can monitor cache coherence events in a non-virtualized environment as well as it monitors coherence events on a coherence interconnect between physical processors.

Figure 4E:
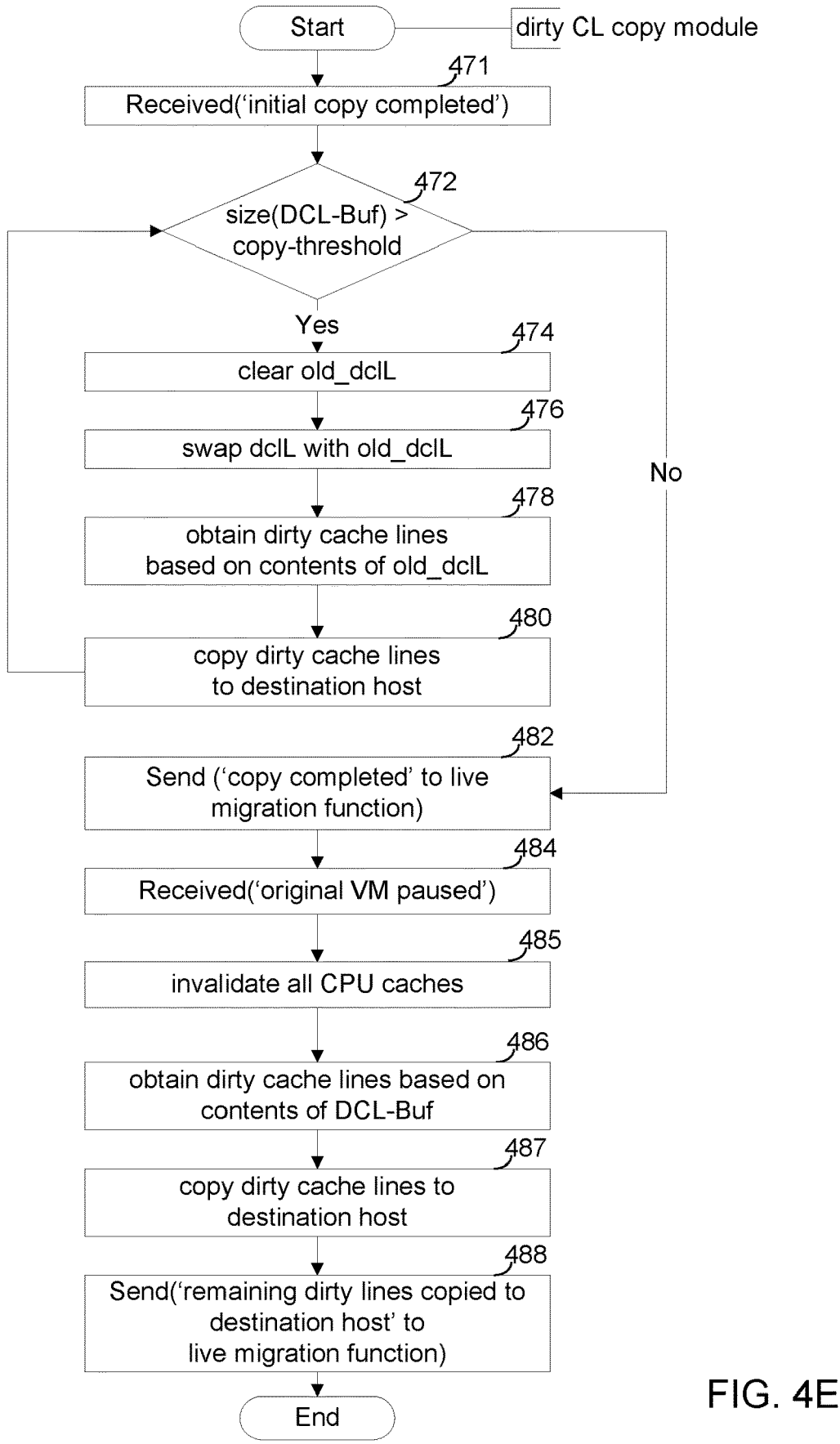
FIG. 4E depicts a flow chart for the dirty CL copy module, in an embodiment.

FIG. 4E depicts a flow chart for the dirty CL copy module. In step 471, module 410 receives an 'initial copy completed' message from page copy module 406 indicating that the initial copy of pages to the destination host is completed. In step 472, module 410 then determines whether or not the size of DCL-Buf 414 is greater than a copy-threshold. If so, then module 410 clears the old_dclL (old dirty cache line list) in step 474 and swaps, in step 476, current DCL-Buf 414 with the old_dcL. In step 478, module 410 obtains dirty cache lines based on the contents of the old dcL. In one embodiment, the old_dcL contains addresses of the dirty cache lines indicating the locations of the dirty cache lines, which the module uses to retrieve the contents of the dirty cache lines. In step 480, module 410 copies the dirty cache lines to the destination host. If the size of DCL-Buf 414 is less than or equal to the copy threshold as determined in step 472, then in step 482, module 410 sends a 'copy completed' message to live migration function 404 and in step 484 receives a 'original VM paused' message from the live migration function 404. In step 485, module 410 invalidates all CPU caches. Alternatively, in step 485, module 410 uses a list 416 of potentially dirty cache lines maintained by data CL module 408, to snoop, via coherence interconnect 114, the CPU caches, which is more efficient than invalidating the caches. In step 486, module 410 then obtains dirty cache lines based on the contents of DCL-Buf 414. In one embodiment, DLC-Buf 414 contains addresses of the dirty cache lines indicating the locations of the dirty cache line, which the module uses to retrieve the contents of the dirty cache lines. With the original VM 402 paused, module 410 copies any remaining dirty cache lines to the destination host and in step 488, sends a 'remaining dirty cache lines copied to destination host' message to live migration function 404. Thus, module 410 copies to the destination host cache lines that have been made dirty by running original VM 402 after the initial copying of the pages is completed to the destination host. In one embodiment, module 410 is included in application-specific modules 218 in FPGA 112, which performs steps 471-488 thus relieving hypervisor 111 of carryout out the steps and reducing the amount of data to be sent to the destination host, because only dirty cache lines instead of dirty pages are sent. However, in some embodiments, adjacent dirty elements represented in DCL-Buff 414 are coalesced and module 410 copies the resulting coalesced element to the destination host in a single operation. In some embodiments, the aggregated element can be an entire page which has sufficient dirty cache lines to be declared a dirty page, thus transferring data to the destination host in units of pages rather than in units of cache lines.

Thus, in this embodiment, there are no page faults to be handled and after the set of pages for the new VM is copied to the destination host, FPGA 112 repeatedly copies only dirty cache lines of pages that are being tracked by FPGA 112. This improves the live migration process because expensive page faults do not occur and the dirty cache lines of pages are transferred to the destination host instead of an entire page.

Figure 5B:
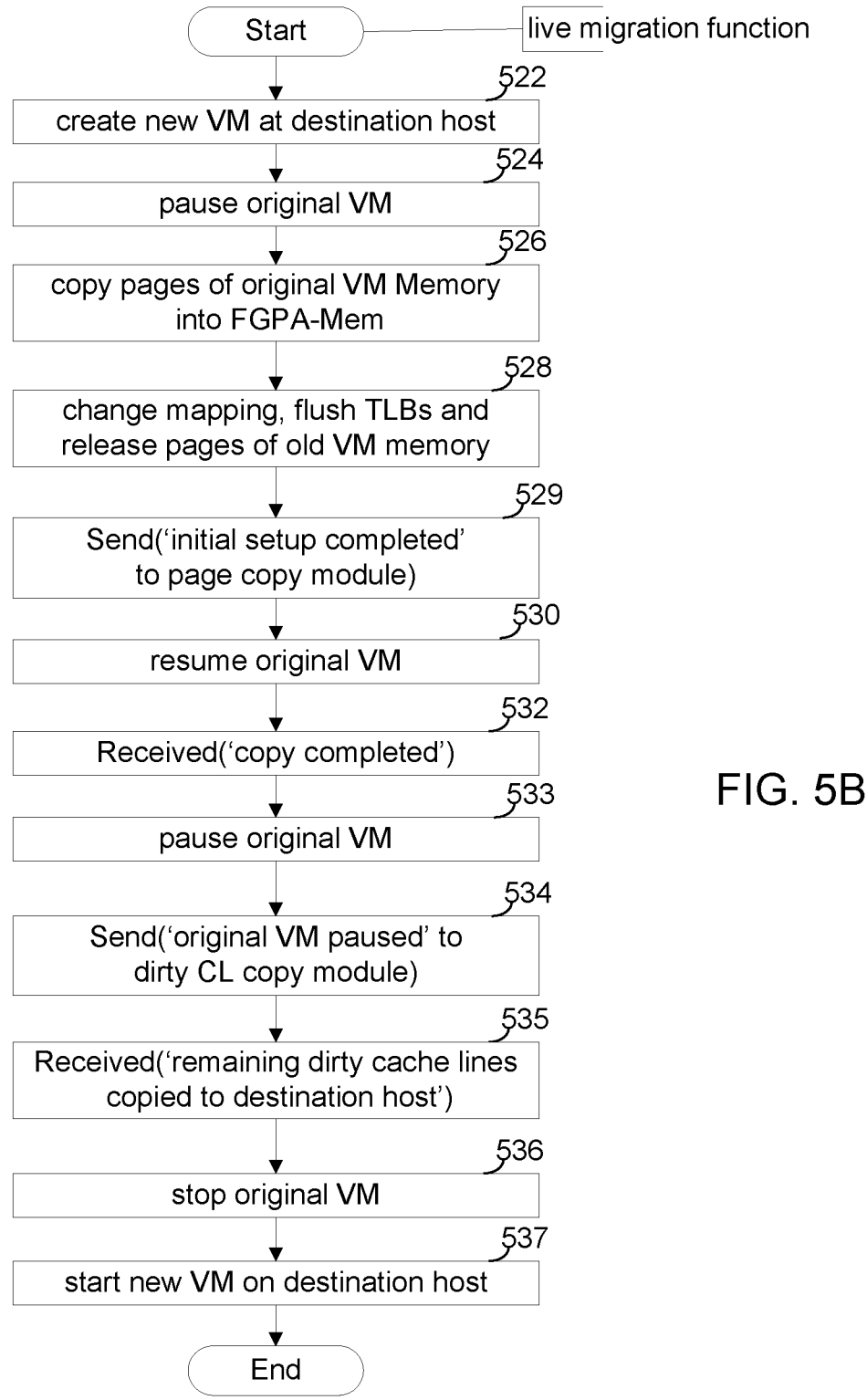
FIG. 5B depicts a flow chart for the live migration function, in an embodiment.

FIG. 5A depicts graphically the various components involved in the live migration procedure in another embodiment. The procedure includes the main line portion, which is live migration function 504, described in regard to FIG. 5B, a page copy module 506 described in regard to FIG. 5C, a FPGA memory (FPGA-Mem) 514, a data CL module 508 described in regard to FIG. 5D, a dirty CL copy module 510 described in regard to FIG. 5E, a list 516 of potentially dirty cache lines, and a dirty cache line buffer (DCL-Buf) 512, which can implement in a variety of ways as described in reference to DCL-Buf 414.

FIG. 5B depicts a flow chart for the main line portion, which is the live migration function. In step 522, function 504 creates a new VM at the destination host. In step 524, function 504 pauses original VM 502 and in step 526, copies the memory pages of original VM 502 into FPGA-Mem 514. In step 528, function 504 changes the mapping of the pages of original VM 502 to point to the pages in FPGA-Mem 514, flushes any TLBs that contain the mapping of the pages of original VM 502 and releases the memory pages of the old VM. In step 529, function 504 sends an 'initial setup completed' message to page copy module 506, letting page copy module 506 know that it can begin page copying. In step 530, function 504 resumes original VM 502, which now runs with its pages in FPGA-Mem 514. In step 532, function 504 receives a 'copy completed' message from dirty CL copy module 510. In response, in step 534, function 504 pauses the original VM and in step 534 sends an 'original VM paused' message to dirty CL copy module 510. In step 535, function 504, receives a 'remaining dirty cache lines copied to destination host' message. In response, function 504 stops original VM 502 in step 536 and in step 537, starts the new VM on the destination host. In one embodiment, hypervisor 111 carries out steps 522-537.

Figure 5C:
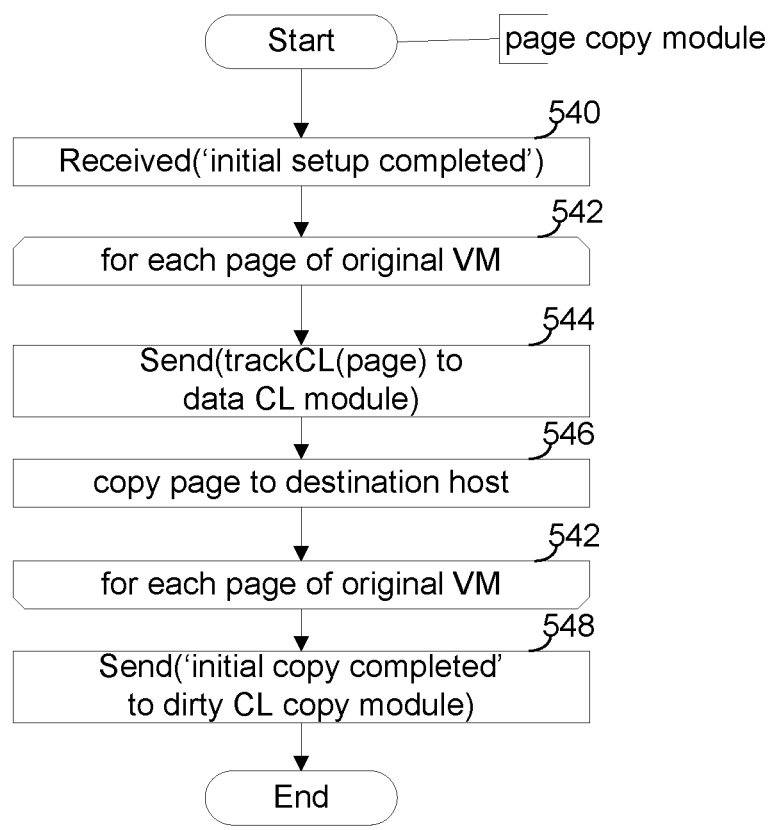
FIG. 5C depicts a flow chart for the page copy module, in an embodiment.

FIG. 5C depicts a flow chart for the page copy module. In step 540, module 506 receives the 'initial setup completed' message from live migration function 504. In response, in step 542, module 506 starts an iterator over steps 544 and 546 which operate on each page of original VM 502. In step 544, module 506 sends a track cache lines of the page ('trackCL(page)') message to data CL module 508, which causes cache lines for each page to be copied to the destination host to be tracked. In step, 546, module 506 copies the page to the destination host. In step 548, module 506 sends an 'initial copy completed' message to dirty CL copy module 510 indicating that all of the pages of the VM have been copied to the destination host. In one embodiment, module 506 is included in application-specific modules 218 in FPGA 112, which performs the steps 542-548.

Figure 5D:
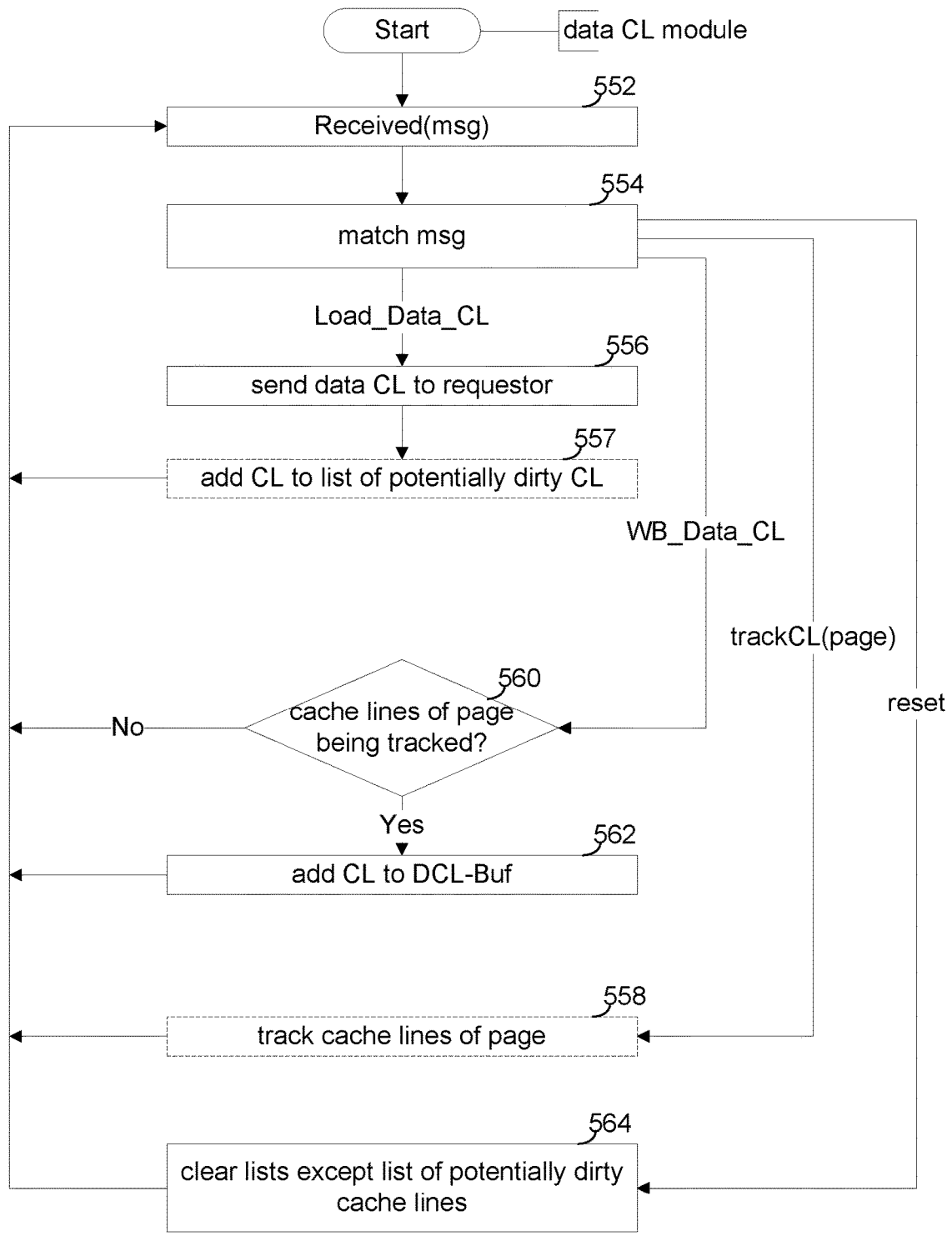
FIG. 5D depicts a flow chart for the data CL module, in an embodiment.

FIG. 5D depicts a flow chart for the data CL module. In step 552, module 508 receives a message and in step 554 matches the message to one of four messages, 'Load_Data_CL', 'trackCL(page)', 'WB_Data_CL' and 'reset'. In step 556, module 508 handles the 'Load_Data_CL' message, which is derived from a cache coherence event on coherence interconnect 114, by sending the cache line to the requestor. In optional step 557, module 508 adds the cache line (CL) to list 516 of potentially dirty cache lines. In optional step 558, module 508 handles the 'trackCL(page)' message by tracking the cache lines of the page specified in the message. In step 560, module 508 handles the 'WB_Data_CL' message, which is derived from a cache coherence write-back event on coherence interconnect 114 or the processor executing a store instruction, which bypasses the caches in the cache hierarchy. Such a store instruction is recognized by cache protocol agent 220 of FPGA 112. Module 508 handles the 'WB_Data_CL' message by determining whether the cache lines of the page are being tracked, and if so, then in step 564, adding the cache line to DCL-Buf 512. In step 564, module 508 handles the 'reset' message by clearing its internal lists, e.g., DCL-Buf 512, but not list 516 of potentially dirty cache lines. In one embodiment, module 508 is included in application-specific modules 218 in FPGA 112, which performs steps 552-564. Though data CL module 508 is used here to monitor cache coherence events of CPU 104 in the context of a hypervisor and the transfer of pages of a virtual machine, it is not so limited. Data CL module 508 can monitor cache coherence events in a non-virtualized environment as well as it monitors coherence events on a coherence interconnect between physical processors.

Figure 5E:
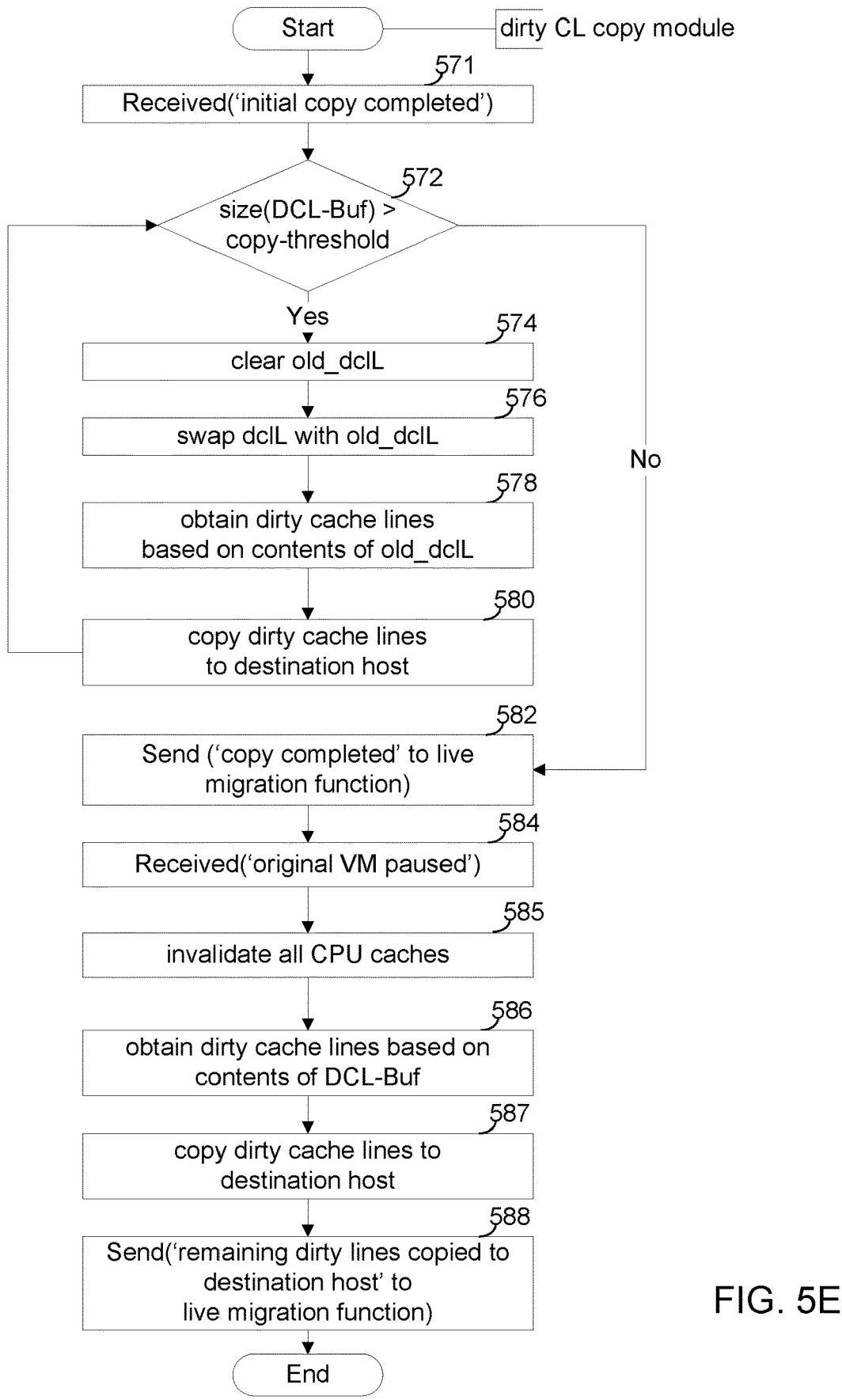
FIG. 5E depicts a flow chart for the dirty CL copy module, in an embodiment.

FIG. 5E depicts a flow chart for the dirty CL copy module. In step 571, the module receives the 'initial copy completed' message from page copy module 506 indicating that page copy module 506 has completed the initial copy of pages to the destination host. In step 572, module 510 then determines whether or not the size of DCL-Buf 512, which has captured dirty lines caused by running VM 502, is greater than a copy-threshold. If so, then module 510 clears the old_dclL (old dirty cache line list) in step 574 and swaps in step 576 current DCL-Buf 512 with the old_dcL. In step 578, module 510 obtains dirty cache lines based on the contents of the old_dcL. In one embodiment, the old_dcL contains addresses of the dirty cache lines indicating the locations of the dirty cache lines, which the module uses to retrieve the contents of the dirty cache lines. In step 580, module 510 copies the dirty cache lines to the destination host. Steps 572 through 580 are repeated until the size of DCL-Buf 512 is less than or equal to the copy-threshold. When the size of DCL-Buf 512 is less than or equal to the copy threshold as determined in step 572, then in step 582, module 510 sends a 'copy completed' message to live migration function 504 and in step 584 receives a 'original VM paused' message from the live migration function 504. In step 585, module 510 invalidates all CPU caches. Alternatively, in step 585, module 510 uses a list 516 of potential dirty cache lines maintained by data CL module 508, to snoop, via coherence interconnect 114, the CPU caches, which is more efficient than invalidating the caches. In step 586, module 510 then obtains dirty cache lines based on the contents of DCL-Buf 512. In one embodiment, DCL-Buf 512 contains addresses of the dirty cache lines indicating the locations of the dirty cache line, which the module uses to retrieve the contents of the dirty cache lines. With the original VM 502 paused, module 510 copies any remaining dirty cache lines to the destination host and in step 588, sends a 'remaining dirty cache lines copied to destination host' message to live migration function 404. Thus, module 510 copies to the destination host cache lines that have been made dirty by running original VM 502 thus updating lines of pages already copied to the destination host. In one embodiment, module 510 is included in application-specific modules 218 in FPGA 112, which performs steps 571-588 thus relieving hypervisor 111 of carryout out the steps and reducing the amount of data to be sent to the destination host, because only dirty cache lines are sent. However, in some embodiments, adjacent dirty elements represented in DCL-Buff 512 are coalesced and module 510 copies the resulting coalesced element to the destination host in a single operation. In some embodiments, the aggregated element can be an entire page.

This embodiment has improved efficiency because there are no page faults to handle and generally less data is transferred because dirty cache lines instead of dirty pages are transferred, unless the dirty cache lines are coalesced into dirty pages, in which case sending entire dirty pages is more efficient. However, in step 526 the pages of original VM 502 are copied into FPGA-Mem 514, which could be a lengthy process if there are a large number of pages for original VM 502. In addition, the copying of the pages of original VM 502 into FPGA-Mem 514 occurs while original VM 502 is paused, which can significantly affect the performance of original VM 502.

Figure 6A:
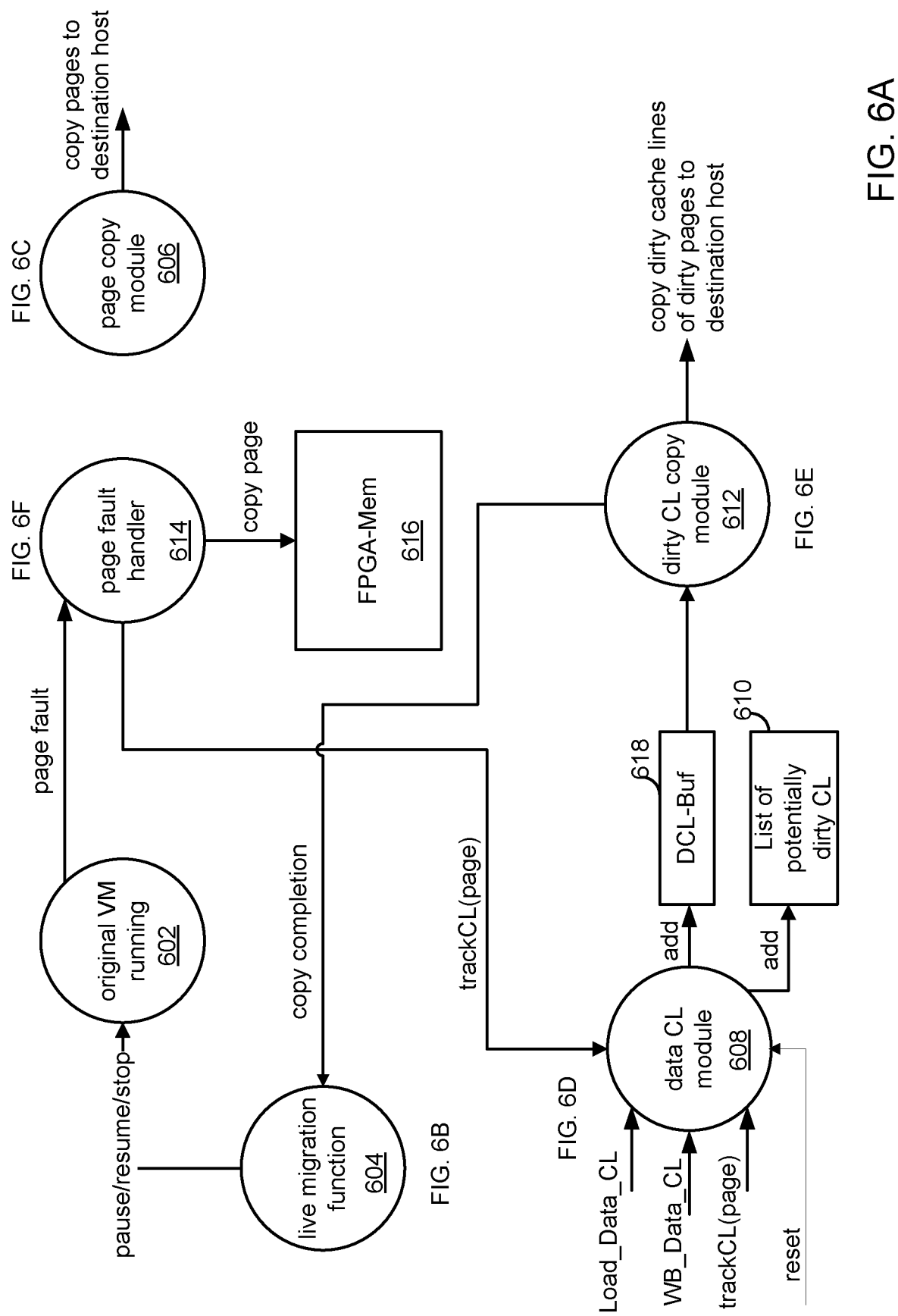
FIG. 6A depicts graphically the various components involved in the live migration procedure in yet another embodiment.

FIG. 6A depicts graphically the various components involved in the live migration procedure in yet another embodiment. The procedure includes a main line portion, which is live migration function 604, described in regard to FIG. 6B, a page copy module 606 described in regard to FIG. 6C, a data CL module 608 described in regard to FIG. 6D, a dirty cache line buffer (DCL-Buf) 618, a list 610 of potentially dirty cache lines, a dirty CL copy module 612 described in regard to FIG. 6E, an FPGA memory (FPGA-Mem) 616 and a page fault handler 614 described in regard to FIG. 6F. DCL-Buf 618 can be implemented in a variety of ways as described in reference to DCL-Buf 414.

Figure 6B:
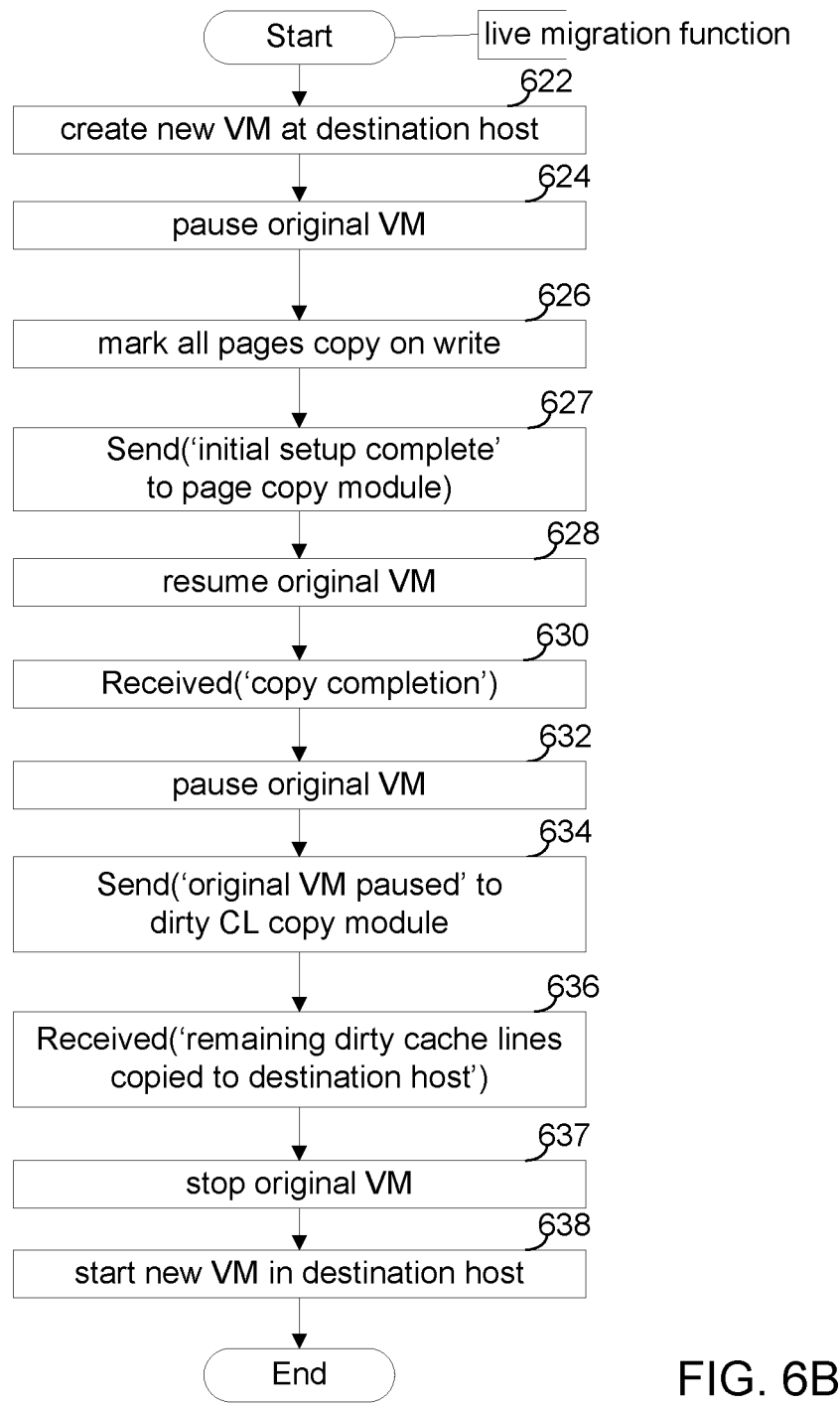
FIG. 6B depicts a flow chart for the live migration function, in an embodiment.

FIG. 6B depicts a flow chart for the main line portion, which is the live migration function. In step 622, function 604 creates a new VM at the destination host. In step 624, function 604 pauses original VM 602 and in step 626, marks all of the pages of original VM 602 as "copy on write," to write protect the pages. In step 627, function 604 sends an 'initial setup complete' message to page copy module 606. In step 628, function 604 resumes original VM 602. In step 630, function 604 receives a 'copy completion' message from dirty CL copy module 612 and in step 632, pauses the original VM. In step 634, the function sends an 'original VM paused' message to the dirty CL copy module. In step 636, the function receives a 'remaining dirty cache lines copied to destination host' message from dirty CL copy module 612 and in step 637 stops original VM 602. In step 638, function 604 starts the new VM in the destination host. In one embodiment, hypervisor 111 carries out steps 622-638.

Figure 6C:
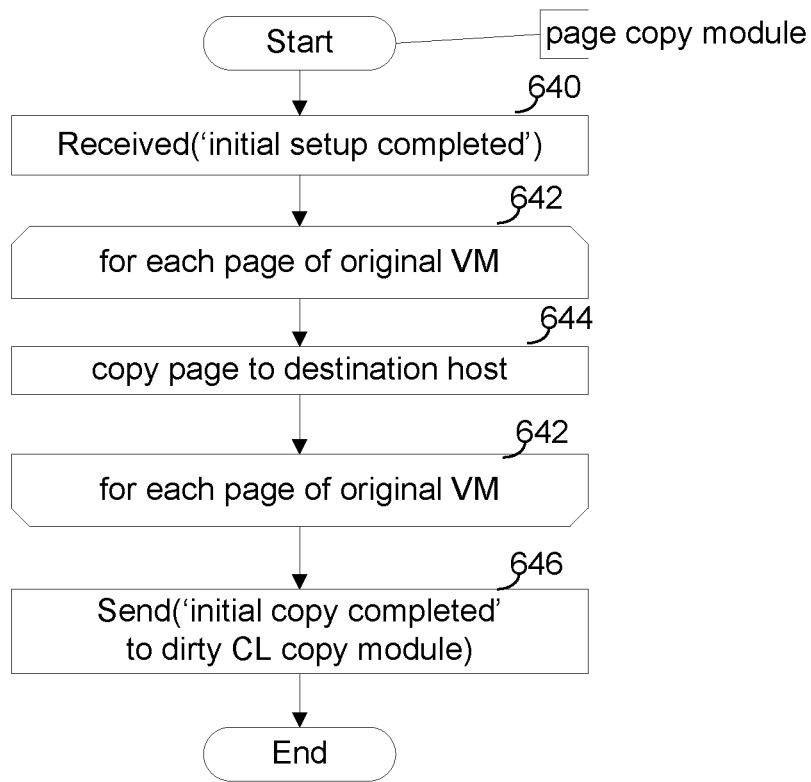
FIG. 6C depicts a flow chart for the page copy module, in an embodiment.

FIG. 6C depicts a flow chart for the page copy module. In step 640, module 606 receives an 'initial setup completed' message from live migration function 604. In step 642, an iterator is started for each page of original VM 602. In step 644, module 606 copies the page to the destination host. In step 646, module 606 sends an 'initial copy completed' message to dirty CL copy module 612. In one embodiment, module 606 is included in application-specific modules 218 in FPGA 112, which carries out steps 640-646. In another embodiment, hypervisor 111 carries out steps 640-646.

Figure 6D:
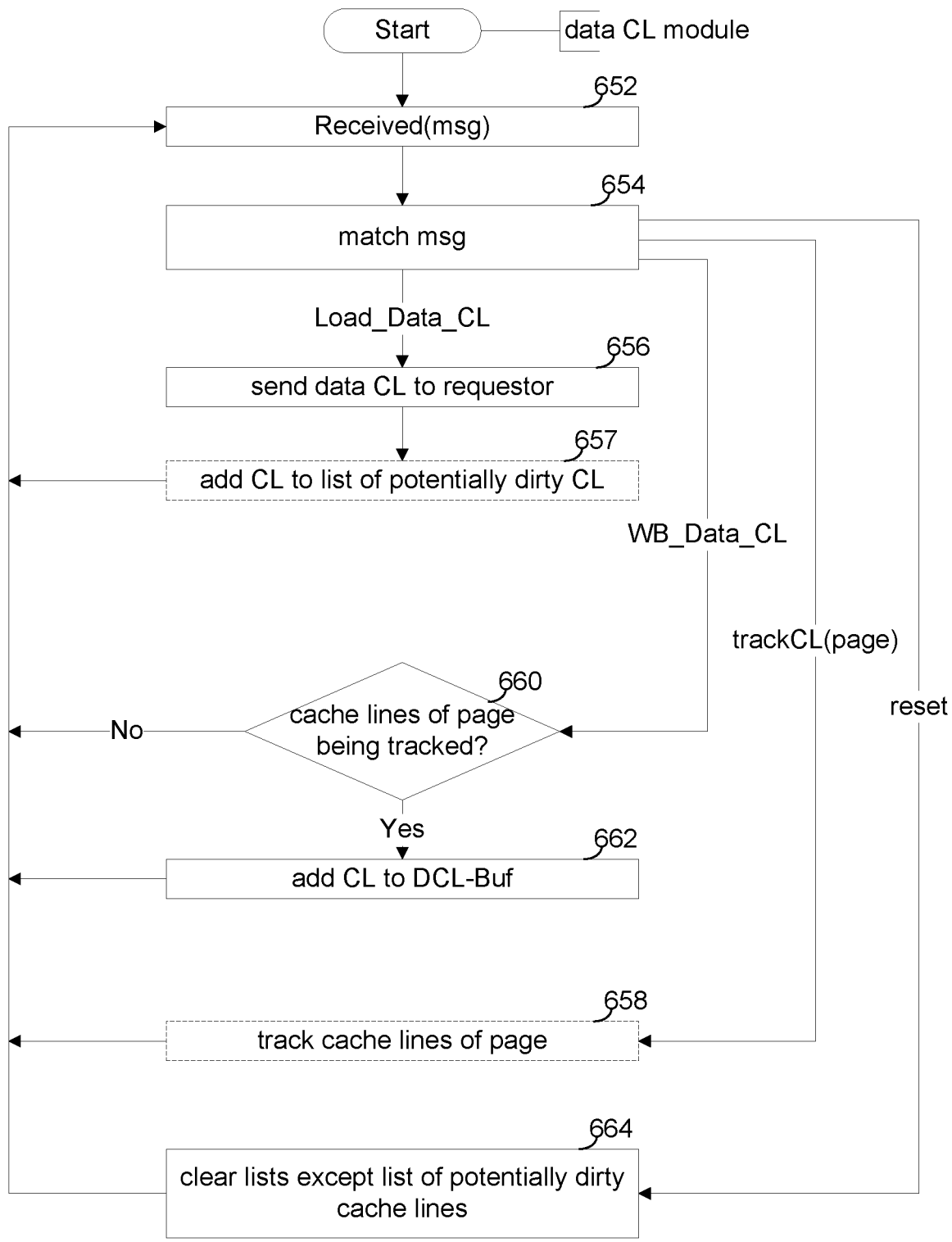
FIG. 6D depicts a flow chart for the data CL module, in an embodiment.

FIG. 6D depicts a flow chart for the data CL module. In step 652, module 608 receives a message and in step 654, matches the received message to one of four messages, 'Load_Data_CL', 'trackCL(page)', 'WB_Data_CL' and 'reset'. In step 656, module 608 handles the 'Load_Data_CL' message by sending the cache line to the requestor. In optional step 657, module 608 adds the cache line to list 610 of potentially dirty cache lines. In optional step 658, module 608 handles the message 'trackCL(page)' by tracking the cache lines of the page specified in the message. In step 660, module 608 handles the 'WB_Data_CL' message, which corresponds to a writeback event on coherence interconnect 114 or the processor executing a store instruction, which bypasses the caches in the cache hierarchy. Such a store instruction is recognized by cache protocol agent 220 of FPGA 112. Module 608 handles the 'WB_Data_CL' message by determining whether the cache lines of the page specified in the message are being tracked, and if so then, in step 662, adding the cache line to DCL-Buf 618. In step 664, module 608 handles the reset message by clearing its internal lists, e.g., DCL-Buf 618, but not list 610 of potentially dirty cache lines. In one embodiment, module 608 is included in application-specific module 218 in FPGA 112, which carries out steps 652-664. Though data CL module is used here to monitor cache coherence events of CPU 104 in the context of a hypervisor and the transfer of pages of a virtual machine, it is not so limited. Data CL module 608 can monitor cache coherence events in a non-virtualized environment as well as it monitors coherence events on a coherence interconnect between physical processors.

Figure 6E:
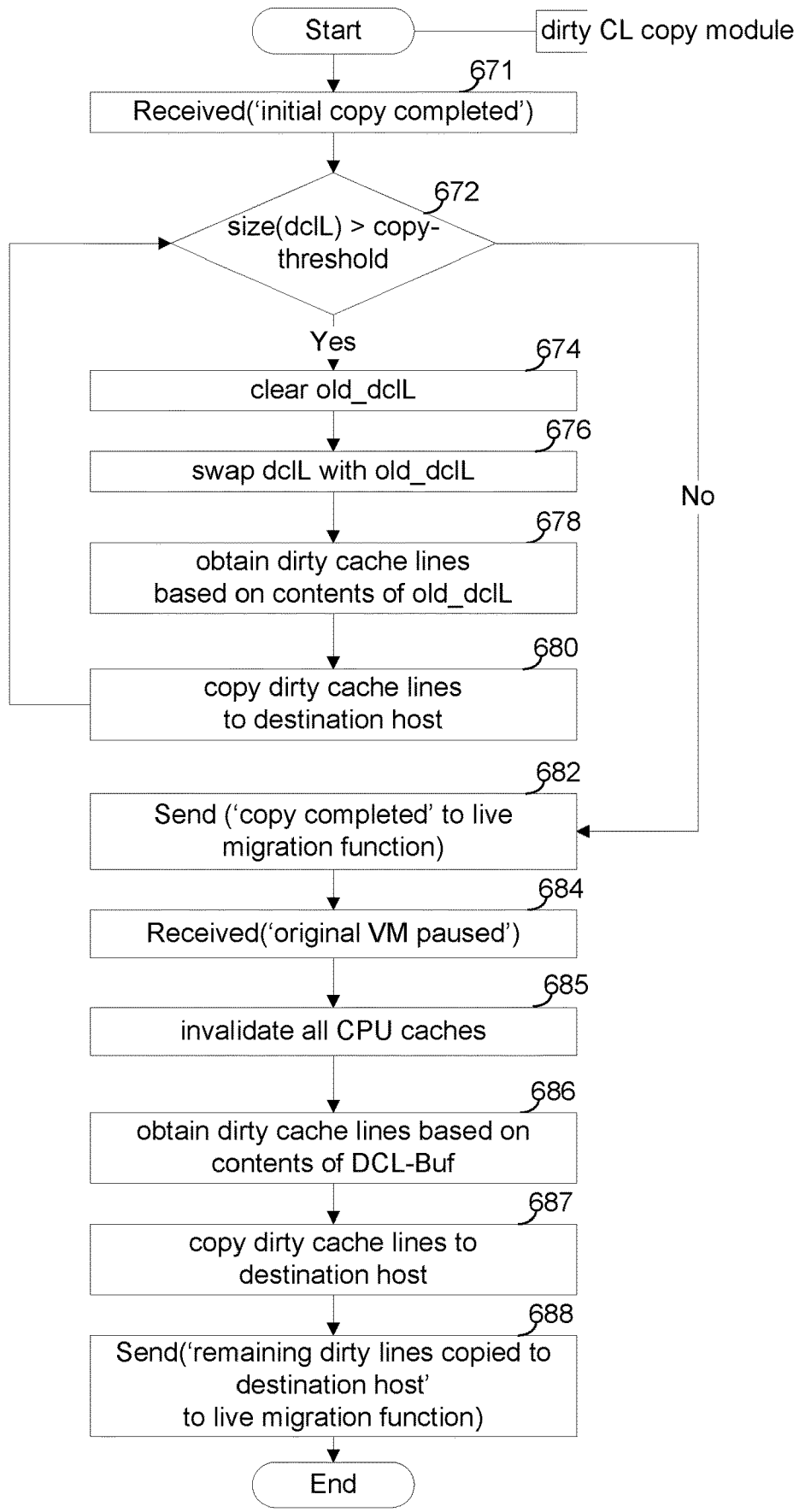
FIG. 6E depicts a flow chart for the dirty CL copy module, in an embodiment.

FIG. 6E depicts a flow chart for the dirty CL copy module. In step 671, the module receives an 'initial copy completed' message from page copy module 606 indicating that the initial copy of pages to the destination host is completed. In step 672, module 612 then determines whether or not the size of DCL-Buf 618 is greater than a copy-threshold. If so, then module 612 clears the old_dclL (old dirty cache line list) in step 674 and swaps in step 676 current DCL-Buf 618 with the old_dcL. In step 678, module 612 obtains dirty cache lines based on the contents of the old_dcL. In one embodiment, the old_dcL contains addresses of the dirty cache lines indicating the locations of the dirty cache lines, which the module uses to retrieve the contents of the dirty cache lines. In step 680, module 612 copies the dirty cache lines to the destination host. If the size of DCL-Buf 618 is less than or equal to the copy threshold as determined in step 672, then in step 682, module 612 sends a 'copy completed' message to live migration function 604 and in step 684 receives a 'original VM paused' message from the live migration function 604. In step 685, module 612 invalidates all CPU caches. Alternatively, module 612 in step 685, uses a list 610 of potentially dirty cache lines maintained by data CL module 608 to snoop, via coherence interconnect 114, the CPU caches, which is more efficient than invalidating the caches. In step 686, module 612 then obtains dirty cache lines based on the contents of DCL-Buf 618. In one embodiment, DLC-Buf 618 contains addresses of the dirty cache lines indicating the locations of the dirty cache line, which the module uses to retrieve the contents of the dirty cache lines. With the original VM 602 paused, module 612 copies any remaining dirty cache lines to the destination host and in step 688, sends a 'remaining dirty cache lines copied to destination host' message to live migration function 604. Thus, module 612 copies to the destination host cache lines that have been made dirty by running original VM 602 thus updating lines of pages already copied to the destination host. In one embodiment, module 612 is included in application-specific modules 218 in FPGA 112, which performs steps 671-688 thus relieving hypervisor 111 of carryout out the steps and reducing the amount of data to be sent to the destination host, because only dirty cache lines instead of dirty pages are sent. However, in some embodiments, adjacent dirty elements represented in DCL-Buff 512 are coalesced and module 510 copies the resulting coalesced element to the destination host in a single operation. In some embodiments, the aggregated element can be an entire page.

Figure 6F:
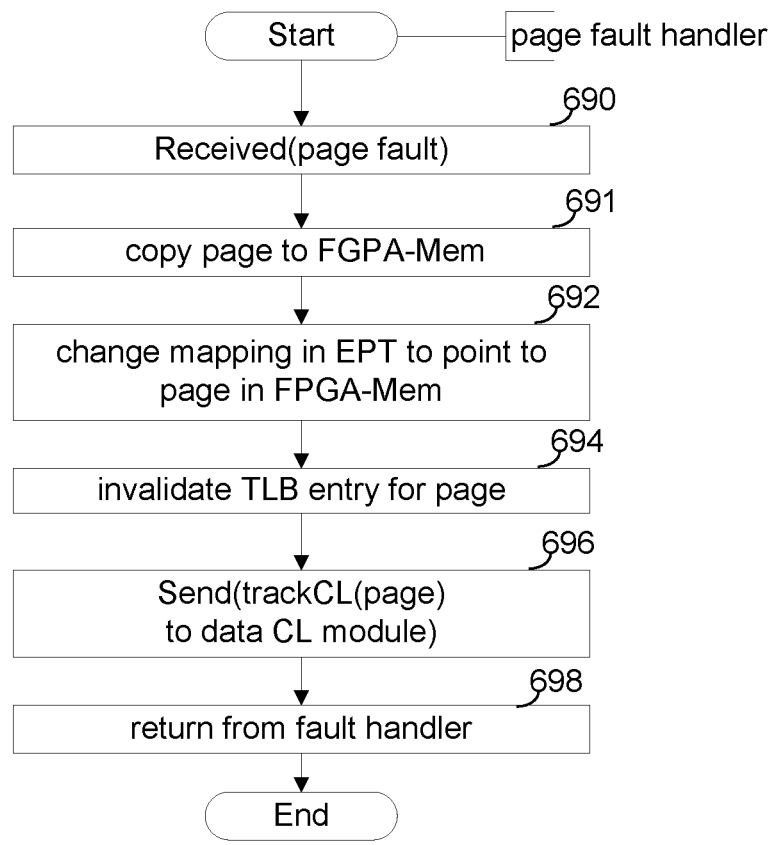
FIG. 6F depicts a flow chart of the page fault handler module, in an embodiment.

FIG. 6F depicts a flow chart of the page fault handler module. In step 690, handler 614 receives a message that a page fault has occurred. In step 691, handler 614 copies the page specified in the message to FPGA-Mem 616. In step 692, handler 614 changes the mapping in the extended page tables (EPT) to point to the page just copied into FPGA-Mem 616. In step 694, handler 614 invalidates the TLB entry for the page. In step 696, handler 614 sends a message 'trackCL(page)' to data CL module 608. In step 692, handler 698 returns. In one embodiment, hypervisor 111 performs steps 690-698.

This embodiment has improved efficiency because original VM 602 need be paused only for as long as it takes to mark all of its pages as "copy on write". In addition, only dirty cache lines of dirty pages are copied to the destination host. However, it still encounters expensive page faults.

Figure 7B:
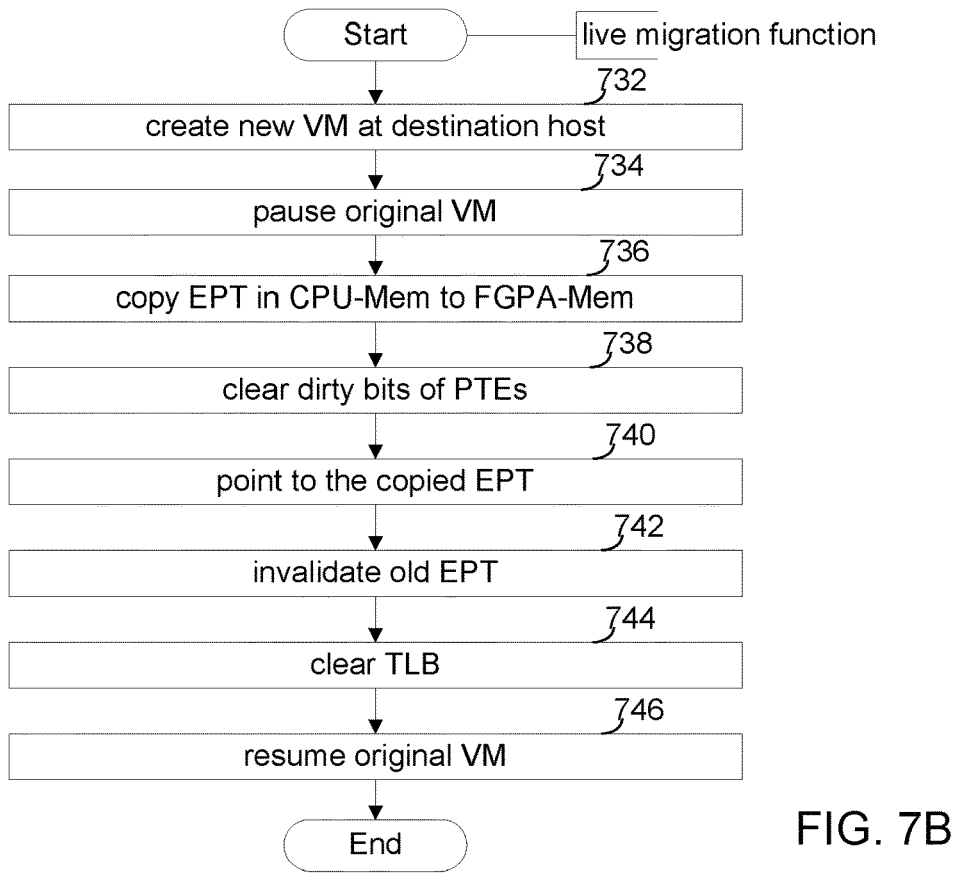
FIG. 7B depicts a flow chart for the live migration function, in an embodiment.

FIG. 7A depicts graphically the various components involved in the live migration procedure in yet another embodiment. The procedure includes a main portion, live migration function 704, described in regard to FIG. 7B, a page copy module 706 described in regard to FIG. 7C, a page table entry CL module 708 described in regard to FIG. 7D, a page table entry loop module 710 described in regard to FIG. 7E, a page loop module 712 described in regard to FIG. 7F, a data CL module 714 described in regard to FIGS. 7G and 7H, a CL loop module 716 described in regard to FIG. 7I, an FPGA memory (FPGA-Mem) 718, a list 726 of potentially dirty cache lines, a Page Dirty Page Table Entry buffer (PDPTE-Buf) 720, a dirty cache line buffer (DCL-Buf) 724 and a Dirty Page buffer (DP-Buf) 722. DCL-Buf 724, DP-Buf 722, and PDPTE-Buf 720 can implement in a variety of ways as described in reference to DCL-Buf 414.

FIG. 7B depicts a flow chart for the main line portion, which is the live migration function. In step 732, function 704 creates a new VM at the destination host. In step 734, function 704 pauses original VM 702 and in step 736, copies the extended page tables (EPT) governing the memory pages of original VM 702 residing in CPU memory 106a to FPGA-Mem 718. In step 738, function 704 clears the dirty bits of the page table entries and in step 740 points to the copied EPTs in FPGA-Mem 718. In step 742, function 704 invalidates the old EPTs in CPU memory 106a. In step 744, function 704 clears the TLB of the CPU and in step 746, resumes original VM 702. Thus, original VM 702 is inoperative only for the time to copy the page tables into FPGA-Mem 718. In one embodiment, hypervisor 111 carries out steps 732-746.

Figure 7C:
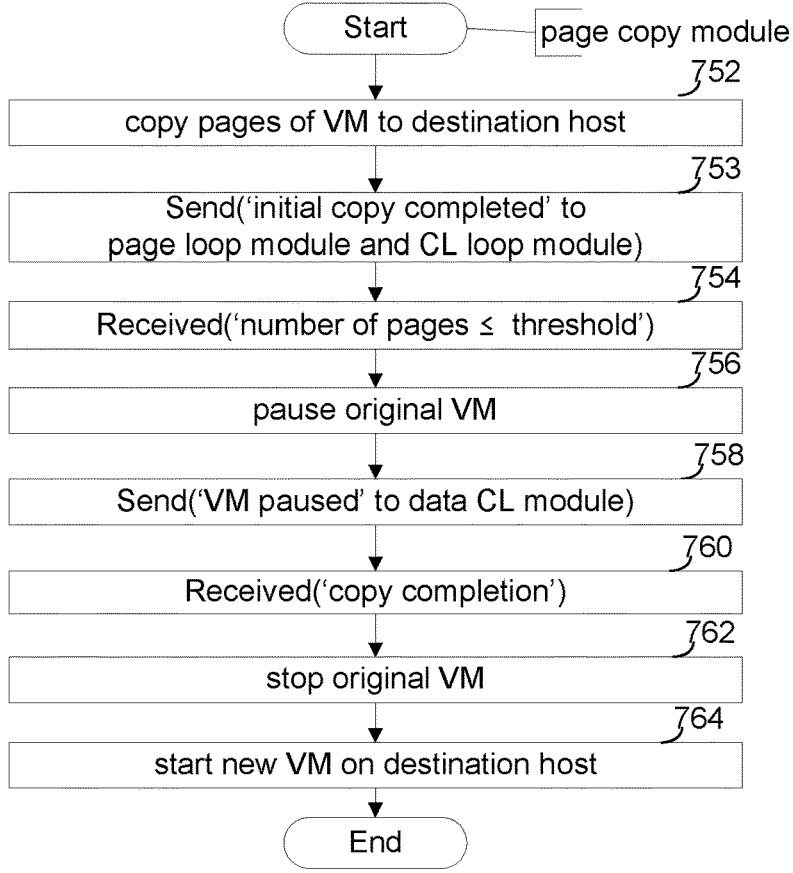
FIG. 7C depicts a flow chart for the page copy module, in an embodiment.

FIG. 7C depicts a flow chart for the page copy module. In step 752, module 706 copies pages of original VM 702 to the destination host. In step 754, module 706 receives a 'number of pages is below a threshold' message from page loop module 712. In step 756, module 706 pauses original VM 702. In step 758, module 706 sends a 'VM paused' message to data CL module 714. In step 760, module 706 receives a 'copy completion' message from CL loop module 716, and, in step 762, and stops original VM 702. In step 764, module 706 starts the new VM on the destination host. In one embodiment, hypervisor 111 performs steps 752-764. In another embodiment, hypervisor carries out steps 754-764, while application-specific modules 218 in FPGA 112 carry out step 752.

Figure 7D:
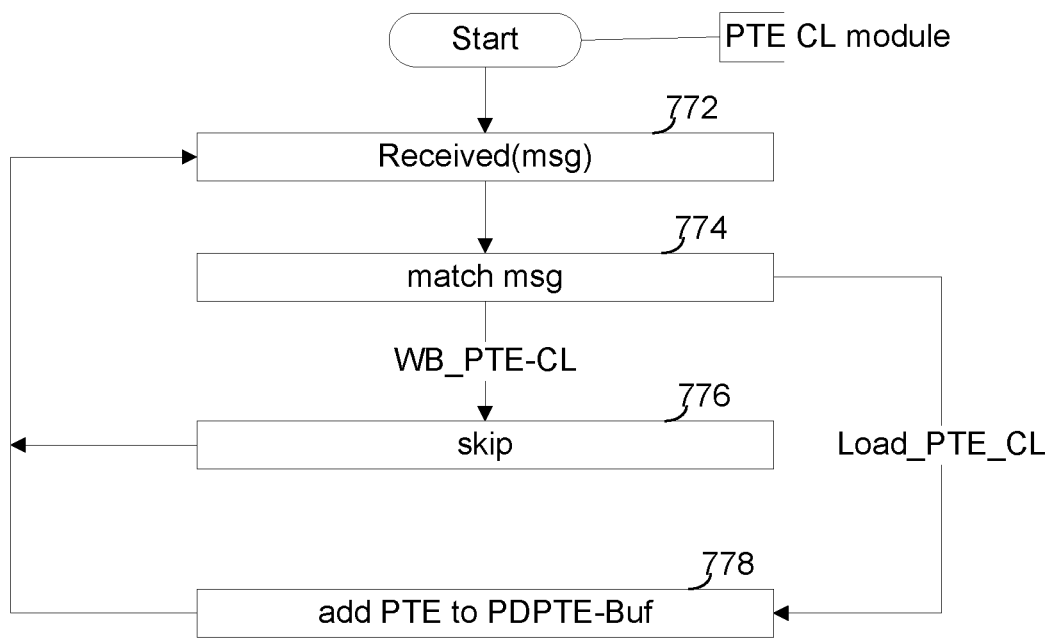
FIG. 7D depicts a flow chart for the page table entry CL module, in an embodiment.

FIG. 7D depicts a flow chart for the page table entry (PTE) CL module. In step 772, module 708 receives a message and in step 774, matches the message to either a 'WB_PTE_CL' or a 'Load_PTE_CL' message, both of which are derived from cache coherence events on coherence interconnect 114. In step 776, module 708 handles the 'WB_PTE_CL' message by taking no action. In step 778, module 708 handles the 'Load_PTE_CL' message by adding a page table entry (PTE) to PDPTE-Buf 720. This indicates operates as a hint that the page referenced by the PTE may become dirty. In one embodiment, module 708 is included in applications-specific module 218 in FPGA 112, which performs steps 772-778.

Figure 7E:
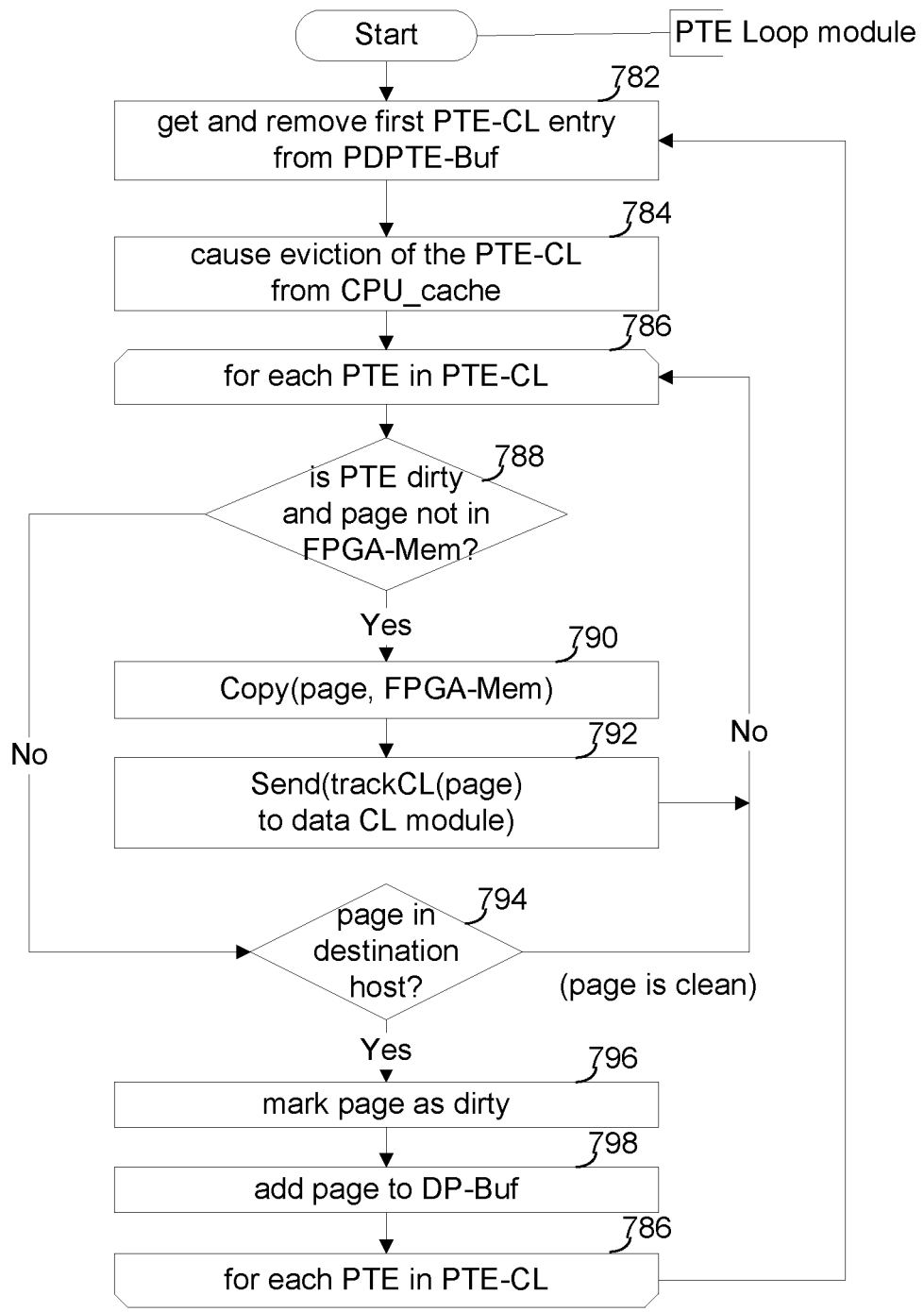
FIG. 7E depicts a flow chart for the page table entry loop module, in an embodiment.

FIG. 7E depicts a flow chart for the page table entry (PTE) loop module. In step 782, module 710 gets and removes a PTE cache line (PTE-CL) entry from the head of PDPTE-Buf 720. In step 784, module 710 causes the eviction of the PTE-CL from the CPU cache via the coherence interconnect. In step 786, module 710 starts an iterator over each page table entry (PTE) in the PTE-CL, as there can be several PTEs in a cache line. In step 788, module 710 determines whether the dirty bit is set and the page is not in FPGA memory 718. If both conditions are true, then in step 790 module 710 copies the page into FPGA-Mem 718 and sends in step 792 a 'trackCL(page)' message to data CL module 714. If, in step 788, the "no branch" is taken because the page is in FPGA-Mem 718, then module 710 determines in step 794 whether the page is in (or in transit to) the destination host. If so, then module 710 marks the page as dirty in step 796 and adds the page to DP-Buf 722 in step 798. Otherwise, the page is clean and module 710 iterates to the next PTE. Thus, module 712 tracks dirty pages based on page table entries by adding a dirty page reference to DP-Buf 722. In one embodiment, module 710 is included in application-specific modules 218 ins FPGA 112, which performs steps 782-798.

Figure 7F:
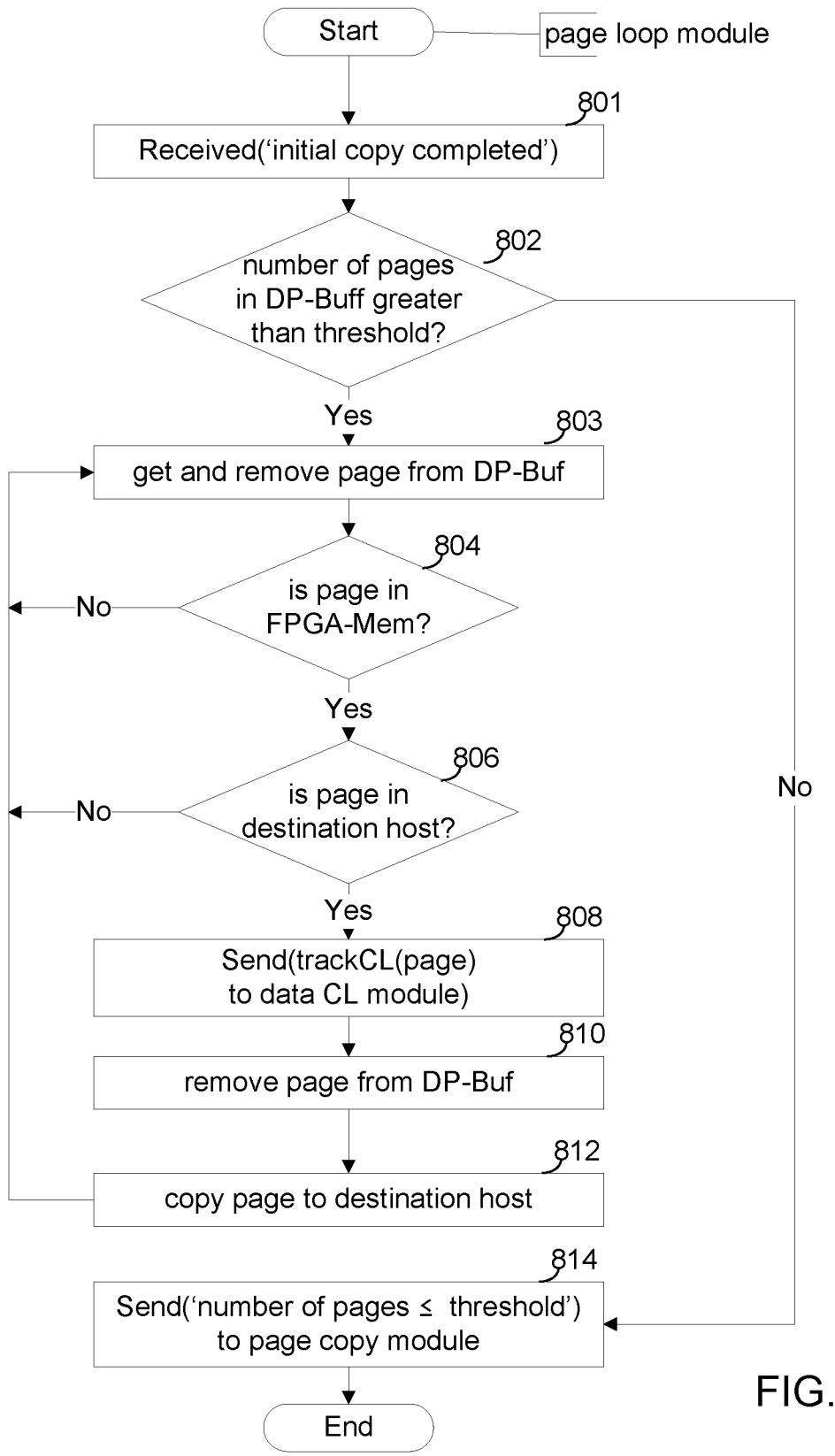
FIG. 7F depicts a flow chart for the page loop module, in an embodiment.

FIG. 7F depicts a flow chart for the page loop module. In step 801, module 712 receives an 'initial copy completed' message from page copy module 706. In step 802, module 712 determines whether the number of pages in DP-Buf 722 is greater than a threshold. If so, then in step 803, module 712 gets and removes a page from DP-Buf 722. In step 804, module 712 determines whether the page is in FPGA-Mem 718. If so, module 712 then determines in step 806 whether the page is in the destination host. If the latter is true, then module 712 sends a 'trackCL(page)' message to data CL module 714 in step 808, removes the page from DP-Buf 722 in step 810 and copies the dirty page to the destination host in step 812. In step 814, module 712 sends a "number of pages≤threshold" message to page copy module 712, which responds by pausing the original VM 702. Thus, module 712 copies dirty pages to the destination host and causes cache lines of the dirty pages to be tracked. In one embodiment, module 712 is included in application-specific modules 218 in FPGA 112, which performs steps 801-814.

Figure 7G:
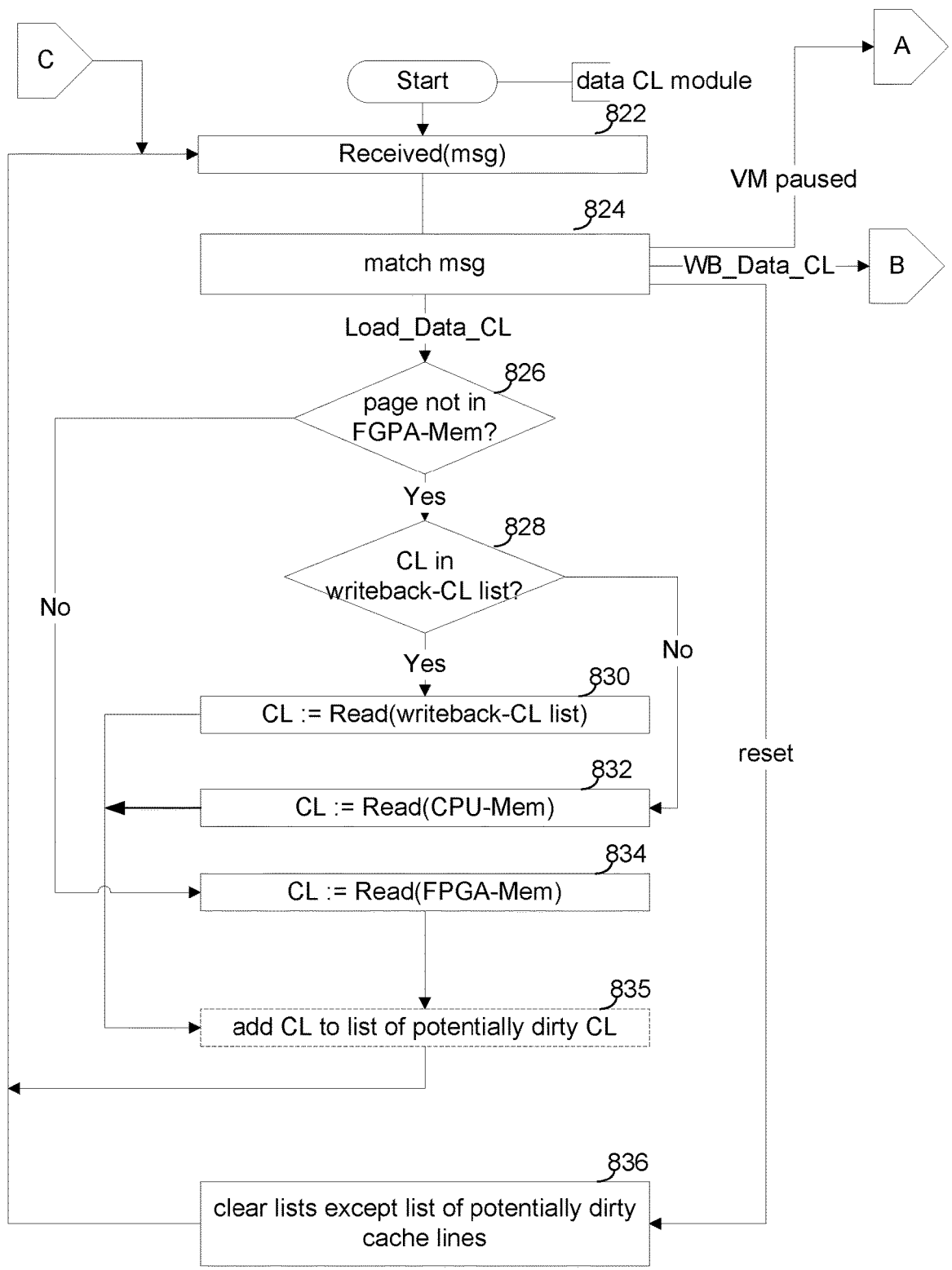
FIG. 7G depicts a flow chart for the data CL module, in an embodiment.
Figure 7H:
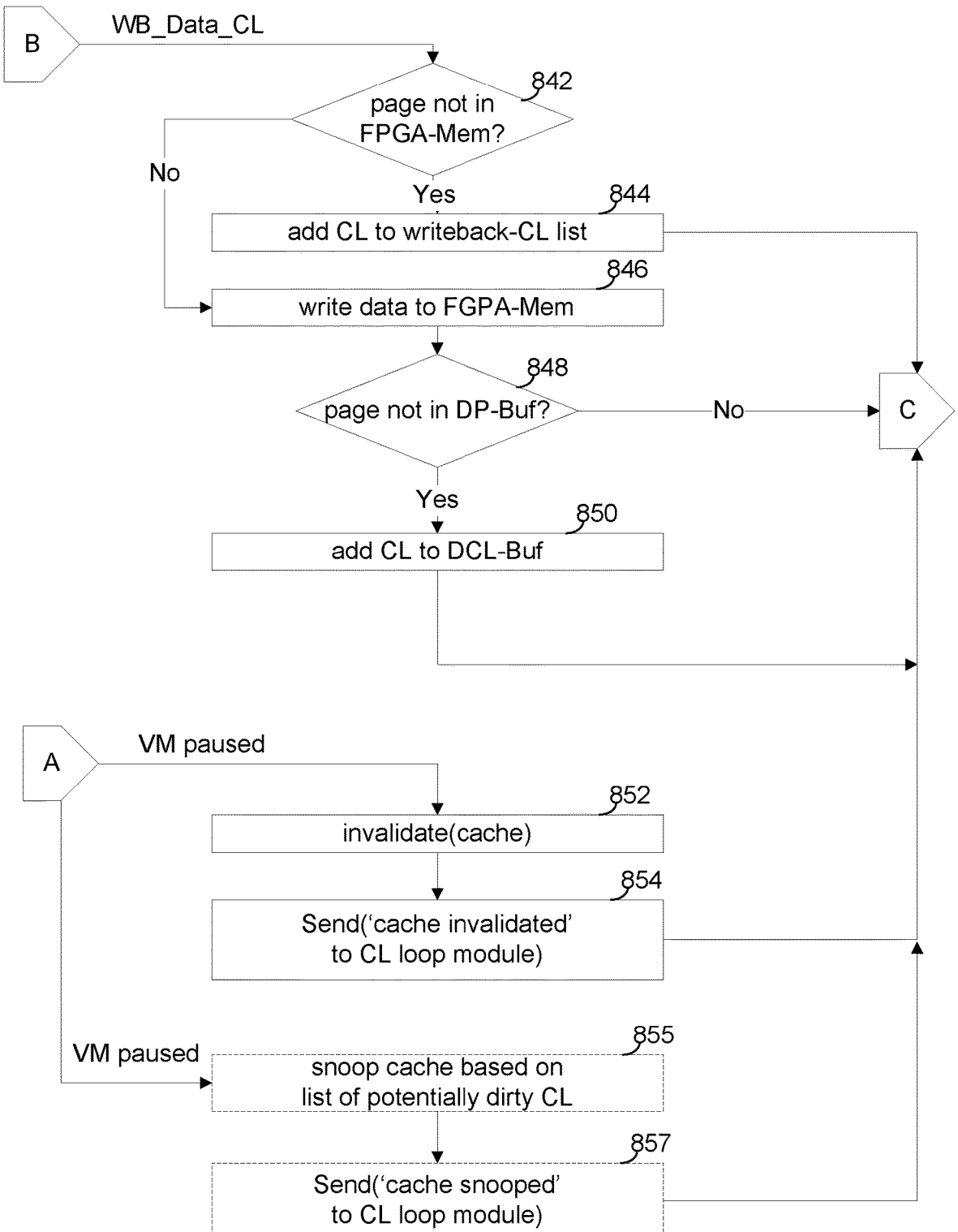
FIG. 7H depicts a flow chart for the additional portions of the data CL module, in an embodiment.

FIGS. 7G and 7H depict flow charts for the data CL module. In step 822 of FIG. 7G, module 714 receives a message. In step 824, module 714 matches the message to one of either the 'Load_Data_CL', 'WB_Data_CL', 'VM paused' or 'reset' messages.

In FIG. 7G, module 714 handles the 'Load_Data_CL' message by determining in step 826 whether or not the page resides in FPGA-Mem 718. If the page does not reside in FPGA-Mem 718, then in step 828, module 714 determines whether the cache line is in the writeback-CL list. If the cache line is in the writeback-CL list, then in step 830, module 714 reads the cache line from the writeback-CL list. If not, then in step 832, module 714 reads the cache line from CPU-Mem 106a. If the page resides in FPGA-Mem 718 as determined in step 826, then module 714 reads the cache line from FPGA-Mem 718 in step 834. In optional step 835, module 714 adds the CL to list 726 of potentially dirty cache lines for use in snooping CPU caches and then module 714 returns to step 822 to receive new messages. In step 836, module 714 handles the 'reset' message by clearing its internal lists, e.g., DCL-Buf 724, but not list 726 of potentially dirty cache lines.

FIG. 7H depicts a flow chart for additional portions of the data CL module. This portion of module 714 handles the 'WB_Data_CL' message, which corresponds to a writeback event on coherence interconnect 114 or the processor executing a store instruction, which bypasses the caches in the cache hierarchy. Such a store instruction is recognized by cache protocol agent 220 of FPGA 112. Module 714 handles the 'WB_Data_CL' message by determining in step 842, whether the page containing the cache line is in FPGA-Mem 718. If the page is not in FPGA-Mem 718, then in step 844, module 714 adds the cache line (CL) to the writeback-CL list. If not, then in step 846, module 714 writes the cache line data into FPGA-Mem 718. In step 848, module 714 determines whether the page is in DP-Buf 722. If the page is not in DP-Buf 722, then in step 850, module 714 adds the cache line to DCL-Buf 724. This portion of module 714 also handles the 'VM paused' message from page copy module 706 by invaliding the CPU cache in step 852 and then in step 854, sending a 'cache invalidated' message to CL loop module 716. Alternatively, in response to the 'VM paused' message, module 714 snoops CPU caches in step 855 based on the list 726 of potentially dirty CL maintained by module 714 and in step 857 sends a 'cache snooped message' to CL loop module 716. Snooping CPU caches based on a list 726 of potentially dirty CL is more efficient than an expensive cache invalidation, which flushes the entire cache. In one embodiment, module 714 is included in application-specific modules 218 in FPGA 112, which carries out steps 822-836, 842-850, 852-854 and steps 855 and 857. Though data CL module 714 is used here to monitor cache coherence events of CPU 104 in the context of a hypervisor and the transfer of pages of a virtual machine, it is not so limited. Data CL module 714 can monitor cache coherence events in a non-virtualized environment as well as it monitors coherence events on a coherence interconnect between physical processors.

Figure 7I:
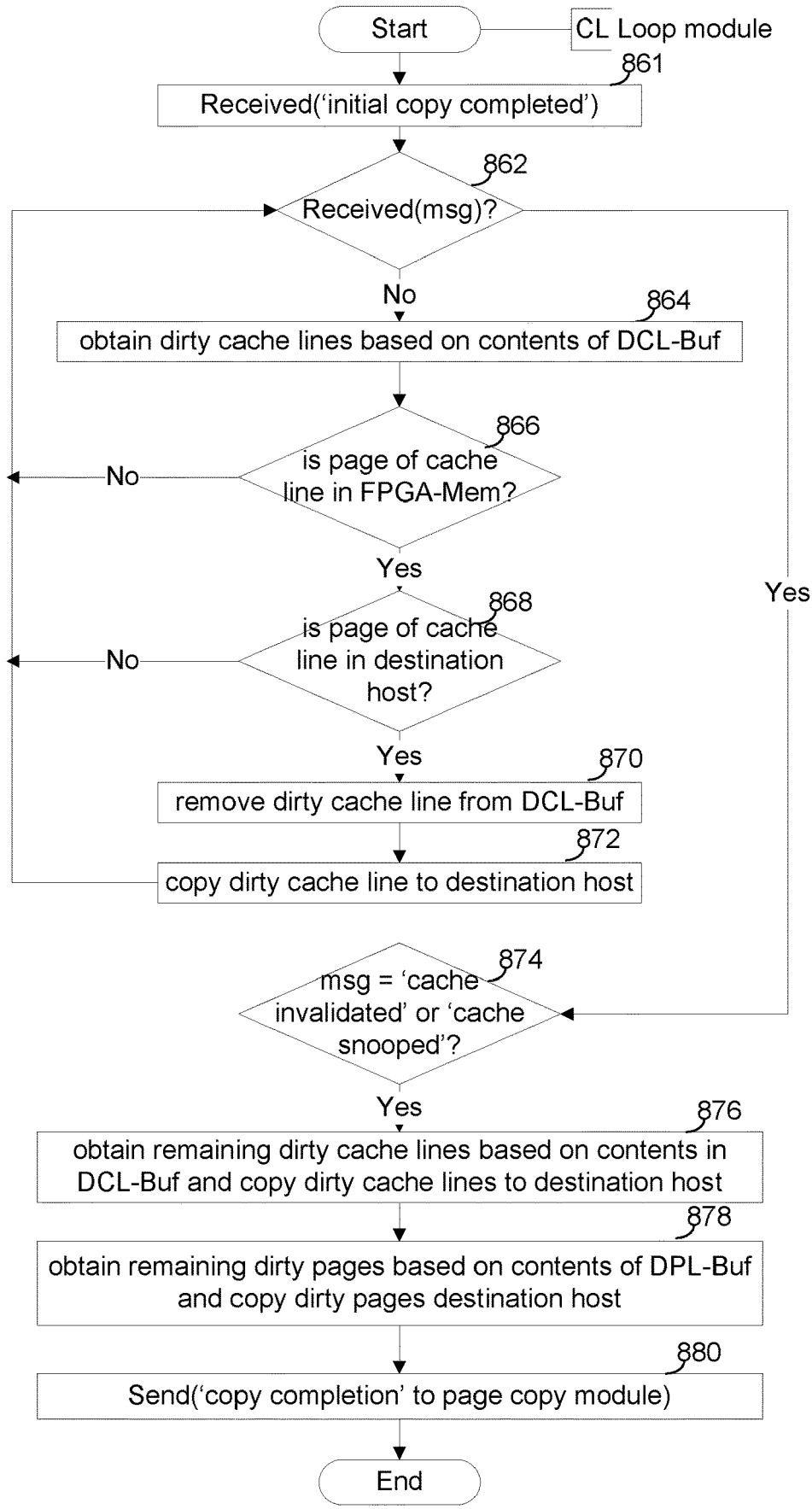
FIG. 7I depicts a flow chart for the CL loop module, in an embodiment.

FIG. 7I depicts a flow chart for the CL loop module. In step 861, module 716 receives an 'initial copy completed' message from page copy module 706. In step 862, module 716 determines whether a message is pending. If no message is pending, then in step 864, module 716 gets a dirty cache line based on the contents of DCL-Buf 724. In step 866, module 716 determines whether the page associated with the cache line is in FPGA-Mem 718. If so, then in step 868, module 716 determines whether the page associated with the cache line is in the destination host. If so, then in step 870, module 716 removes the dirty cache line entry from DCL-Buf 724 and copies the dirty cache line to the destination host in step 872.

If a message is pending as determined in step 872, then module 716 tests in step 874 whether the message is a 'cache invalidated' or a 'cache snooped' message was sent from data CL module 714. If so, then in step 876, module 716 copies the remaining cache lines in DCL-Buf 724 to the destination host. In step 878, module 716 copies the remaining pages of DP-Buf 722 to the destination host and in step 880, sends a 'copy completion' message to page copy module 706. In one embodiment, module 716 is included in application-specific modules 218 in FPGA 112, which carries out steps 861-880.

Figure 8:
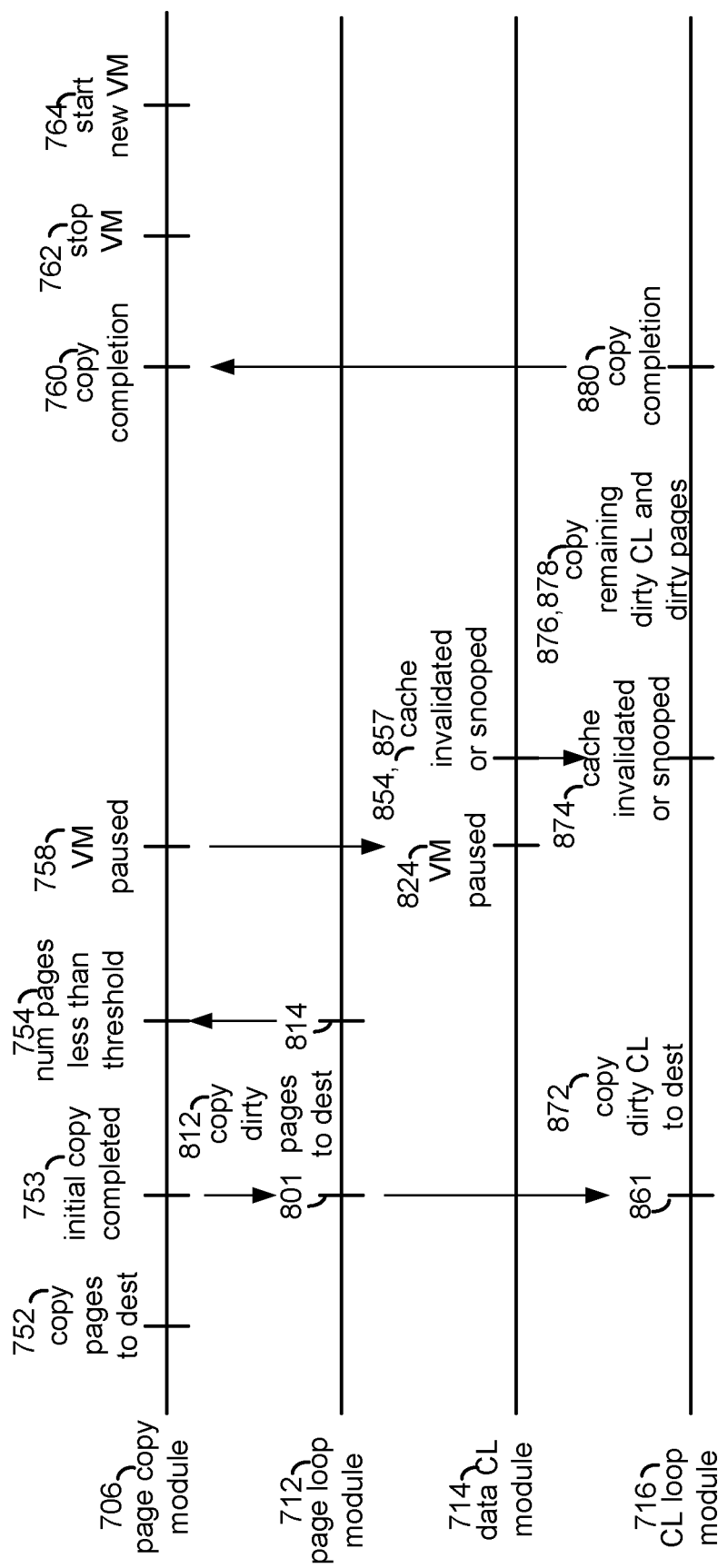
FIG. 8 depicts a time line of events for the live migration procedure of FIG. 7A-7I, in an embodiment.

FIG. 8 depicts a time line overview of key events for the live migration procedure of FIGS. 7A-7I. Time lines for page copy module 706, page loop module 712, data CL module 714 and CL loop module 716 are included and steps described below refer to those in flow charts of FIGS. 7B-7I. At step 752, page copy module 706 copies pages of the original VM 702 to the destination host and signals 'initial copy completed' in step 753. This message is received in page loop module 712 at step 802 and in CL loop module 716 at step 861. In response, page loop module 712 copies dirty pages to the destination host and in step 814 sends a message that the number of pages in DP-Buf 722 is less than a threshold. Page copy module 706 receives the message that the number of pages is less that a threshold and pauses the VM and sends a message a 'VM paused' message in step 758. Data CL module receives the 'VM paused' message at step 824 and invalidates or snoops the CPU cache to obtain indications of any dirty cache lines in the cache and sends a 'cache invalidated' or 'cache snooped' message to CL loop module 716. CL loop module 716 receives the message at step 874 and responds by copying remaining dirty cache lines in DCL-Buf 724 and dirty pages in DP-Buf 722 to the destination host at steps 876 and 878 and sends a 'copy completion' message to page copy module 706 at step 880. Page copy module 706 receives the message at step 760 and, in response, stops original VM 702 at step 762 and causes the new VM to start at step 764.

This embodiment of the live migration procedure avoids page faults and tracks and copies only dirty pages and dirty cache lines of dirty pages to the destination host. This results in more efficiency in that fewer items are copied to the destination host.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for migrating a virtual machine running on a source host to a destination host, wherein the source host includes a first processor having a first memory, and a second processor having a second memory, the method comprising:
    performing an initial copy of the virtual machine by copying all memory pages of the virtual machine to the destination host;
    after performing the initial copy and while the virtual machine is running on the first processor of the source host, tracking by the second processor of the source host, cache lines of one or more memory pages of the memory pages of the virtual machine, the one or more memory pages made dirty as a result of write operations performed on the one or more memory pages, wherein the second processor tracks the cache lines by snooping the cache lines, the snooping causing, for dirty cache lines of the cache lines, a writeback transaction to be triggered on a coherence interconnect between the first processor and the second processor; and
    copying, by the second processor, the dirty cache lines to the destination host without copying the entire memory page for at least one of the one or more memory pages.

2. The method of claim 1, wherein the dirty cache lines are copied to the destination host using a network interface configured in the second processor.

3. The method of claim 1, further comprising:
    prior to performing the initial copy of the virtual machine, copying all the memory pages of the virtual machine to the second memory.

4. The method of claim 1, further comprising:
    prior to performing the initial copy of the virtual machine, write protecting all of the memory pages of the virtual machine, wherein, after performing the initial copy, a write to any of the write-protected memory pages causes a page fault, which results in the write-protected memory page being copied to the second memory.

5. The method of claim 1, further comprising:
    prior to performing the initial copy of the virtual machine:
        pausing the virtual machine running on the source host;
        while the virtual machine is paused, copying page table entries (PTEs) that map guest physical memory pages of the virtual machine to physical memory pages of the source host to the second memory and clearing dirty bits of the copied PTEs, the dirty bits of the PTEs indicating a second one or more memory pages of the memory pages of the virtual machine to be tracked as dirty while the virtual machine is running; and
        resuming execution of the virtual machine; and
    after resuming the virtual machine and while the virtual machine is running, copying the second one or more memory pages to the second memory and to the destination host.

6. The method of claim 5, further comprising:
    while the virtual machine is running, tracking the second one or more memory pages; and
    upon determining that a total number of tracked pages is less than a threshold, pausing the virtual machine, wherein the second one or more memory pages are copied to the destination host while the virtual machine is paused.

7. The method of claim 1, wherein the first processor is a central processing unit (CPU) and the second processor is a field programmable gate array (FPGA), and the CPU and the FPGA communicate with each other using a point-to-point processor interconnect protocol.

8. A system for migrating a virtual machine from a source host to a destination host, comprising:
    the source host including a hypervisor, a first processor having a first memory, and a second processor having a second memory, wherein the virtual machine is running on the first processor;
    wherein the hypervisor performs an initial copy of the virtual machine, by copying all memory pages of the virtual machine to the destination host;
    wherein the second processor tracks cache lines of one or more memory pages of the memory pages of the virtual machine that become dirty as a result of write operations performed on the one or more memory pages while the virtual machine is running on the first processor, wherein the second processor tracks the cache lines by snooping the cache lines, the snooping causing a writeback transaction to be triggered on a coherence interconnect between the first processor and the second processor for any dirty cache lines; and wherein the second processor copies the dirty cache lines to the destination host without copying the entire memory page for at least one of the one or more memory pages.

9. The system of claim 8, wherein the second processor copies the dirty cache lines to the destination host using a network interface configured in the second processor.

10. The system of claim 8, wherein the hypervisor copies all the memory pages of the virtual machine to the second memory prior to performing the initial copy of the virtual machine.

11. The system of claim 8, wherein the hypervisor write protects all of the memory pages of the virtual machine prior to performing the initial copy of the virtual machine; and wherein, after performing the initial copy, a write to any of the write-protected memory pages causes a page fault, which results in the hypervisor copying the write-protected memory page to the second memory.

12. The system of claim 8, wherein the hypervisor pauses the virtual machine running on the source host prior to performing the initial copy of the virtual machine;

wherein, while the virtual machine is paused, the hypervisor copies page tables entries (PTEs) that map guest physical memory page of the virtual machine to physical memory pages of the source host to the second memory and clears dirty bits of the copied PTEs, the dirty bits of the PTEs indicating a second one or more memory pages of the memory pages of the virtual machine to be tracked as dirty; and wherein the hypervisor resumes execution of the virtual machine after copying the PTEs.

13. The system of claim 12, wherein, for the second one or more memory pages, the second processor copies the second one or more memory pages to the second memory and to the destination host.

14. The system of claim 13, wherein while the virtual machine is running, the second processor tracks the second one or more memory pages and upon determining that a total number of tracked pages is less than a threshold, pauses the virtual machine and copies the dirty second one or more memory pages to the destination host while the virtual machine is paused.

15. The system of claim 8, further comprising a point-to-point processor interconnect;

wherein the first processor is a central processing unit (CPU) and the second processor is a field programmable gate array (FPGA); and wherein the point-to-point processor interconnect connects the CPU to the FPGA and the CPU and the FPGA communicate with each other using a protocol supported by the interconnect.

16. A device of a source host for migration of a virtual machine to a destination host, the device comprising:

first circuitry configured to perform an initial copy of the virtual machine by copying all memory pages of the virtual machine to the destination host, and track cache lines of one or more memory pages of the memory pages of the virtual machine of the source host that become dirty as a result of write operations performed on the one or more memory pages while the virtual machine is running on a processor in the source host, wherein the first circuitry tracks the cache lines by snooping the cache lines, the snooping causing, for dirty cache lines of the cache lines, a writeback transaction to be triggered on a coherence interconnect between the device and the processor; and second circuitry configured to copy the dirty cache lines to the destination host without copying the entire memory page for at least one of the one or more memory pages.

17. The device of claim 16, wherein the second circuitry is further configured to copy the dirty cache lines to the destination host using a network interface configured in the device.

18. The device of claim 16, further comprising a point-to-point processor interconnect;

wherein the processor is a central processing unit (CPU) and the device is an FPGA; and wherein the point-to-point processor interconnect connects the CPU to the FPGA and the CPU and the FPGA communicate with each other using a protocol supported by the interconnect.

\* \* \* \* \*